United States Patent
Mathur (12)

(10) Patent No.: US 6,251,356 B1
(45) Date of Patent: Jun. 26, 2001

(54) HIGH SPEED MANUFACTURING PROCESS FOR PRECIPITATED CALCIUM CARBONATE EMPLOYING SEQUENTIAL PERSSURE CARBONATION

(75) Inventor: Vijay K. Mathur, Federal Way, WA (US)

(73) Assignee: G. R. International, Inc., Federal Way, WA (US)

(*) Notice: Subject to any disclaimer, the term of this patent is extended or adjusted under 35 U.S.C. 154(b) by 0 days.

(21) Appl. No.: 09/358,759

(22) Filed: Jul. 21, 1999

(51) Int. Cl.[7] .................................................. C01F 11/18
(52) U.S. Cl. ............................................. 423/432; 423/430
(58) Field of Search ..................................... 423/430, 432

(56) References Cited

U.S. PATENT DOCUMENTS

| | | | |
|---|---|---|---|
| 601,007 | 3/1898 | Sturcke . | |
| 2,211,908 | 8/1940 | O'Connor | 23/66 |
| 2,386,389 | 10/1945 | Elkington et al. | 23/67 |
| 2,462,277 | 2/1949 | Naugle | 252/413 |
| 2,802,719 | 8/1957 | Avedikian | 23/66 |
| 3,150,926 | 9/1964 | Pope et al. | 23/66 |
| 3,304,154 | 2/1967 | Kiouzes-Pezas | 23/66 |
| 3,833,464 | 9/1974 | Rolfe | 162/29 |
| 3,920,800 | 11/1975 | Harris | 432/432 |
| 4,124,439 | 11/1978 | Dessauer | 162/146 |
| 4,157,379 | 6/1979 | Arika et al. | 423/430 |
| 4,159,312 | 6/1979 | Shibazaki et al. | 423/268 |
| 4,219,590 | 8/1980 | Shibazaki et al. | 427/215 |
| 4,237,147 | 12/1980 | Merten et al. | 426/590 |
| 4,242,318 | 12/1980 | Brahm et al. | 423/430 |
| 4,244,933 | 1/1981 | Shibazaki et al. | 423/430 |
| 4,272,498 | 6/1981 | Faatz | 423/242 |
| 4,279,661 | 7/1981 | Strauch et al. | 106/288 B |
| 4,367,207 | 1/1983 | Vanderheiden | 423/232 |
| 4,559,214 | 12/1985 | Howard et al. | 423/430 |
| 4,714,603 | 12/1987 | Vanderheiden | 423/432 |
| 4,760,138 | 7/1988 | So et al. | 536/102 |
| 4,762,588 | 8/1988 | Hirano et al. | 156/623 |
| 4,767,464 | 8/1988 | Strauch et al. | 106/464 |
| 4,824,654 | 4/1989 | Ota et al. | 423/432 |
| 4,828,620 | 5/1989 | Mallow et al. | 106/100 |
| 4,892,590 | 1/1990 | Gill et al. | 106/214 |
| 4,894,217 | 1/1990 | Ostman | 423/659 |
| 4,927,618 | 5/1990 | Mathur et al. | 423/432 |
| 4,961,823 | 10/1990 | Hirano et al. | 156/623 R |
| 4,980,395 | 12/1990 | Mathur et al. | 523/200 |
| 5,043,017 | 8/1991 | Passaretti | 106/465 |
| 5,059,407 | 10/1991 | Wallace et al. | 423/421 |
| 5,075,093 | 12/1991 | Tanaka et al. | 423/432 |
| 5,120,365 | 6/1992 | Kogler | 106/415 |
| 5,156,719 | 10/1992 | Passaretti | 162/158 |
| 5,164,006 | 11/1992 | Chapnerkar et al. | 106/465 |
| 5,164,172 | 11/1992 | Katayama et al. | 423/432 |
| 5,169,682 | 12/1992 | Asai | 427/217 |
| 5,187,125 | 2/1993 | Someya et al. | 501/1 |
| 5,215,734 | 6/1993 | Kunesh et al. | 423/430 |
| 5,223,239 | 6/1993 | Moran et al. | 423/640 |
| 5,227,025 | 7/1993 | Kunesh et al. | 162/181.2 |
| 5,230,734 | 7/1993 | Kumasaka et al. | 106/464 |
| 5,232,678 | 8/1993 | Bleakley et al. | 423/432 |
| 5,269,818 | 12/1993 | Kunesh et al. | 23/304 |
| 5,275,651 | 1/1994 | Minayoshi et al. | 106/464 |
| 5,292,365 | 3/1994 | Delfosse | 106/464 |
| 5,296,002 | 3/1994 | Passaretti | 23/304 |
| 5,326,897 | 7/1994 | Jagers et al. | 558/260 |
| 5,332,564 | 7/1994 | Chapnerkar et al. | 423/432 |
| 5,342,600 | 8/1994 | Bleakley et al. | 423/432 |
| 5,364,610 | 11/1994 | Merris, Jr. | 423/432 |
| 5,376,343 | 12/1994 | Fouche | 423/165 |
| 5,411,639 | 5/1995 | Kurrie | 162/175 |
| 5,413,635 | 5/1995 | Matweecha et al. | 106/792 |
| 5,437,720 | 8/1995 | Cox et al. | 106/415 |
| 5,455,050 | 10/1995 | Beyerle et al. | 424/682 |
| 5,494,651 | 2/1996 | Minayoshi et al. | 423/432 |
| 5,500,131 | 3/1996 | Metz | 210/705 |
| 5,505,819 | 4/1996 | De Witt et al. | 162/142 |
| 5,514,212 | 5/1996 | Kurrie | 106/465 |
| 5,518,540 | 5/1996 | Jones, Jr. | 106/638 |
| 5,531,821 | 7/1996 | Wu | 106/464 |
| 5,543,153 | 8/1996 | Walton | 424/466 |

(List continued on next page.)

OTHER PUBLICATIONS

"The Action of Carbon Dioxide Under Pressure Upon a Few Metal Hydroxides at o°C[1] " by F.K. Cameron and W.O. Robinson, Journal of Physical Chemistry, vol. XII, (7 pages).

Paper on "Reactions Between Carbon Dioxide and Lime-water", 4.10, pp. 329–337.

Paper on "Application of High–Opacity Precipitated Calcium Carbonate", June D. Passaretti, et al; vol. 76, No. 12, Tappi Journal, pp. 135–140, Dec., 1993.

Phamplet "Albafil", Specialty Minerals, Inc. 1994.

Paper on "Calcium Carbonate", Ian C. MacGugan, Handbook of Pulp and Paper Technology, Kenneth W. Britt, 1970, pp. 627–630.

Primary Examiner—Stuart Hendrickson
(74) Attorney, Agent, or Firm—R. Reams Goodloe, Jr.

(57) ABSTRACT

A process for the production of precipitated calcium carbonate. A slurry of calcium hydroxide is agitated in a pressurized reactor, and carbon dioxide is provided under pressure to the reactor to produce precipitated calcium carbonate at a high reaction rate. Carbon dioxide is utilized at a high efficiency. Solubilized calcium ions and carbonate ions react to produce a calcium carbonate precipitate. Control of process conditions such as temperature, slurry concentration, and pressure, enables production of a desired crystal habit (including sclenohedral, rhombohedral, stacked rombohedral, or aragonite crystal structures), crystal size, or crystal aspect ratio. The precipitated calcium carbonate produced by the process under pressure is useful as either a paper filler or as an ingredient in paper coatings, and provides a paper product with improved preselected properties, which properties include opacity, density, and/or brightness.

72 Claims, 27 Drawing Sheets

U.S. PATENT DOCUMENTS

| | | | |
|---|---|---|---|
| 5,558,782 | 9/1996 | Bleakley et al. | 210/712 |
| 5,558,850 | 9/1996 | Bleakley et al. | 423/432 |
| 5,584,923 | 12/1996 | Wu | 106/464 |
| 5,593,488 | 1/1997 | Wu | 106/464 |
| 5,593,489 | 1/1997 | Wu | 106/464 |
| 5,595,819 | 1/1997 | Anderson et al. | 428/330 |
| 5,599,388 | 2/1997 | Wu | 106/464 |
| 5,634,968 | 6/1997 | Pfaller et al. | 146/286.6 |
| 5,643,415 | 7/1997 | Wise | 162/181.2 |
| 5,643,631 | 7/1997 | Donigian et al. | 427/218 |
| 5,650,562 | 7/1997 | Jones, Jr. | 73/38 |
| 5,653,795 | 8/1997 | Brown | 106/469 |
| 5,665,205 | 9/1997 | Srivatsa et al. | 162/181.4 |
| 5,676,747 | 10/1997 | Brown | 106/465 |
| 5,679,723 | 10/1997 | Cooper et al. | 523/115 |
| 5,690,897 | 11/1997 | Drummond | 423/173 |
| 5,695,733 | 12/1997 | Kroc et al. | 423/432 |
| 5,711,802 | 1/1998 | Theil | 106/792 |
| 5,759,258 | 6/1998 | Sohara et al. | 106/464 |
| 5,792,440 | 8/1998 | Huege | 423/432 |
| 5,824,364 | 10/1998 | Cousin et al. | 427/212 |
| 5,833,747 | 11/1998 | Bleakley et al. | 106/464 |

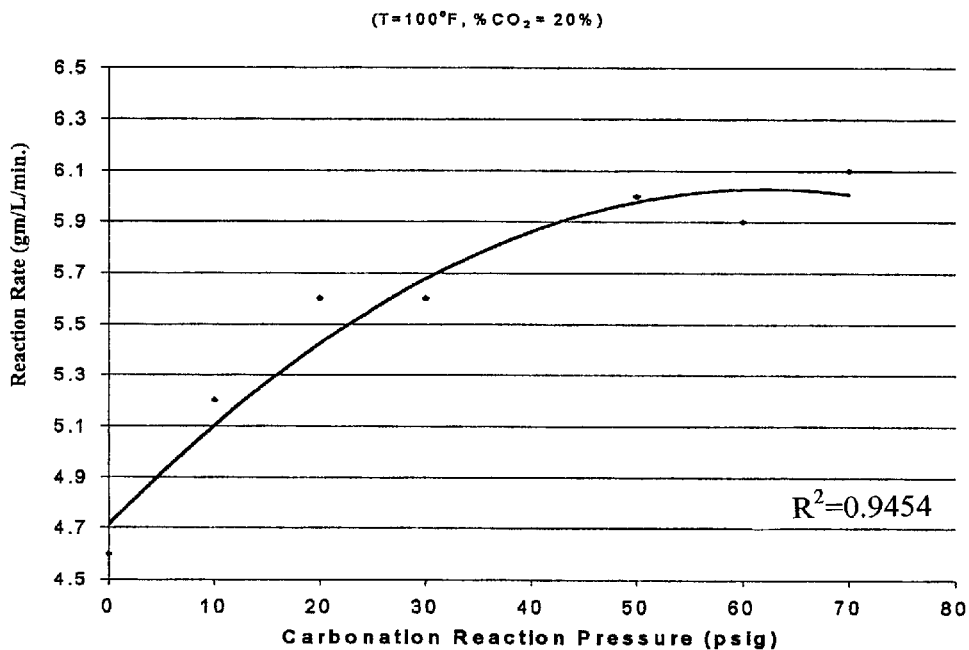
Figure 1: Effect of Carbonation Reaction Pressure on Reaction Rate
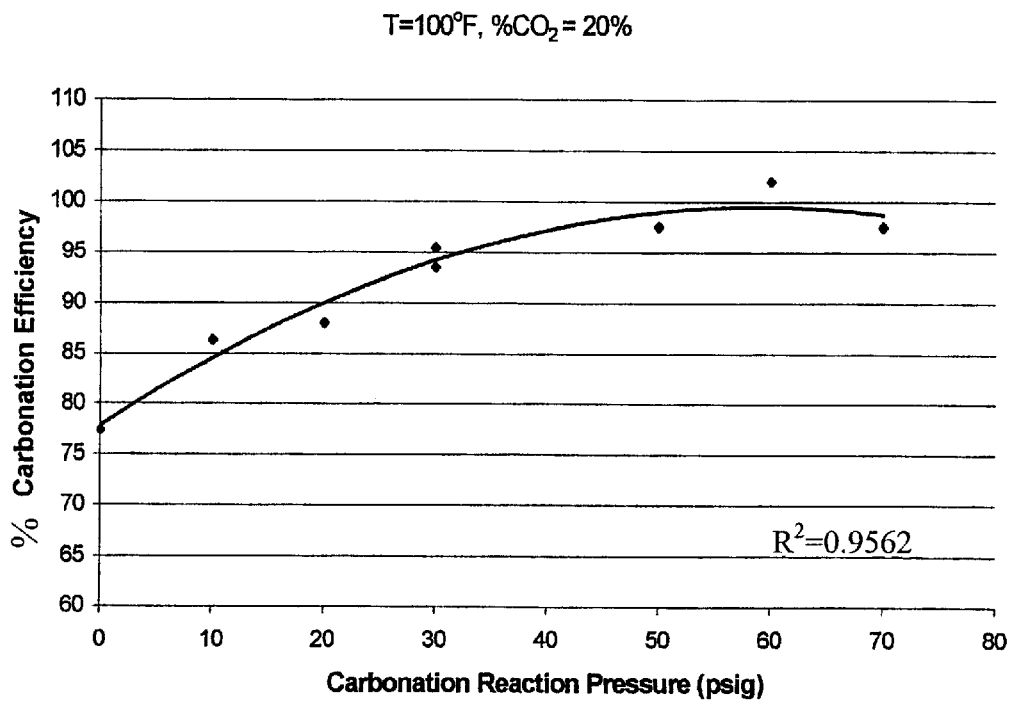
Figure 2: Effect of Carbonation Reaction Pressure on Carbonation Efficiency

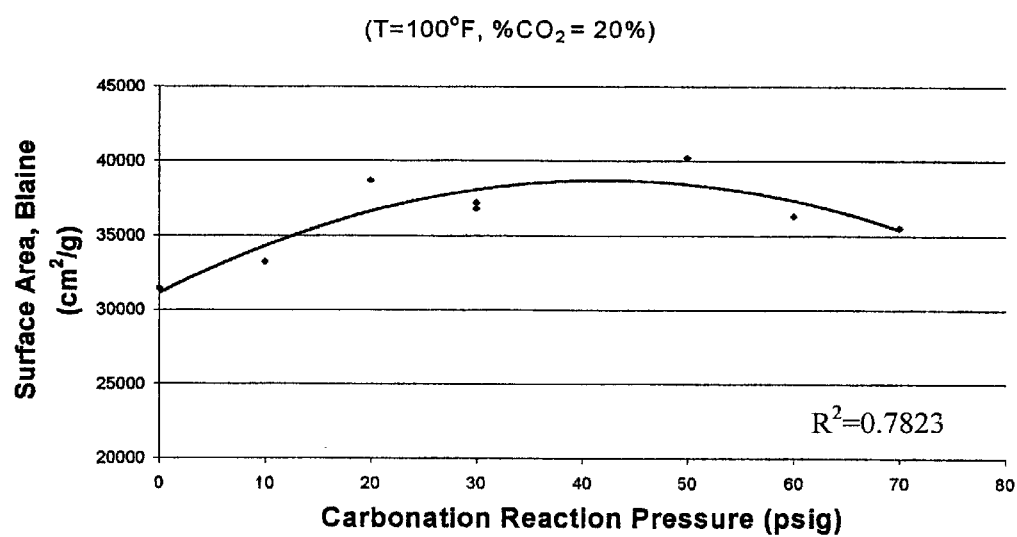
Figure 3: Effect of Carbonation Reaction Pressure on PCC Surface Area

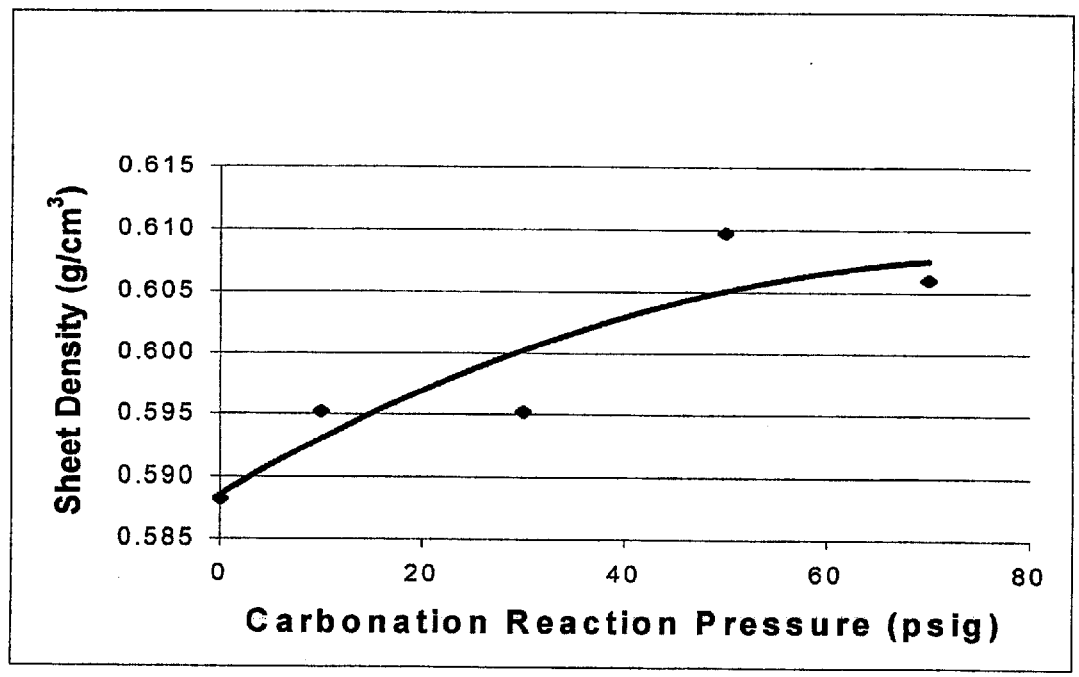
Figure 4: Effect of Carbonation Reaction Pressure on Sheet Density
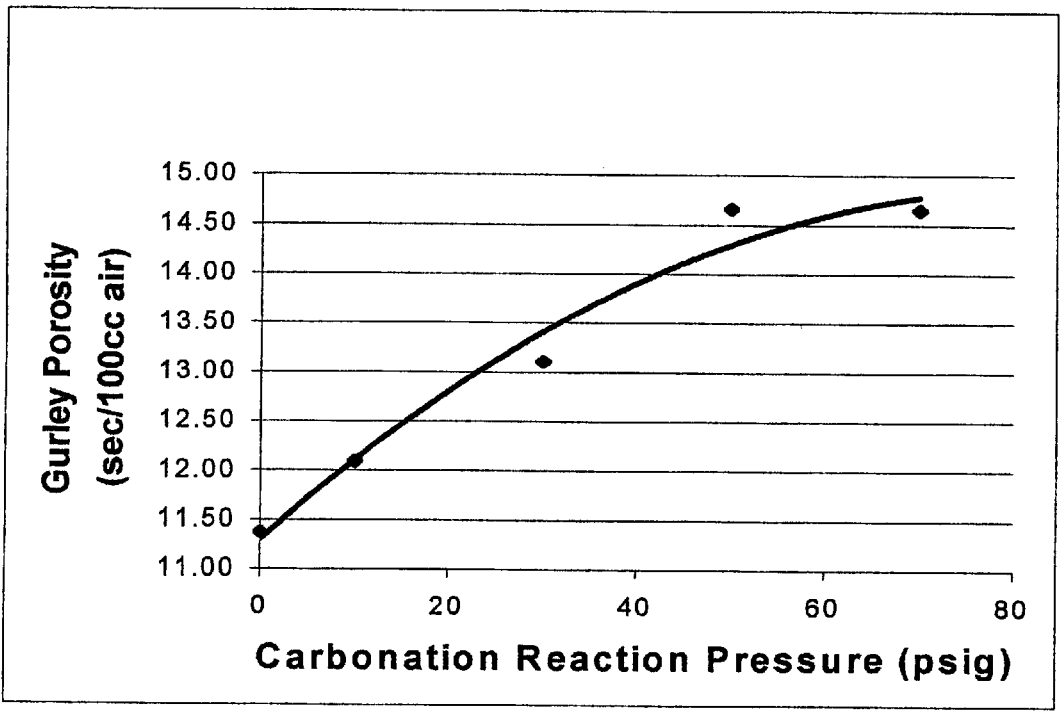
Figure 5: Effect of Carbonation Reaction Pressure on Sheet Porosity

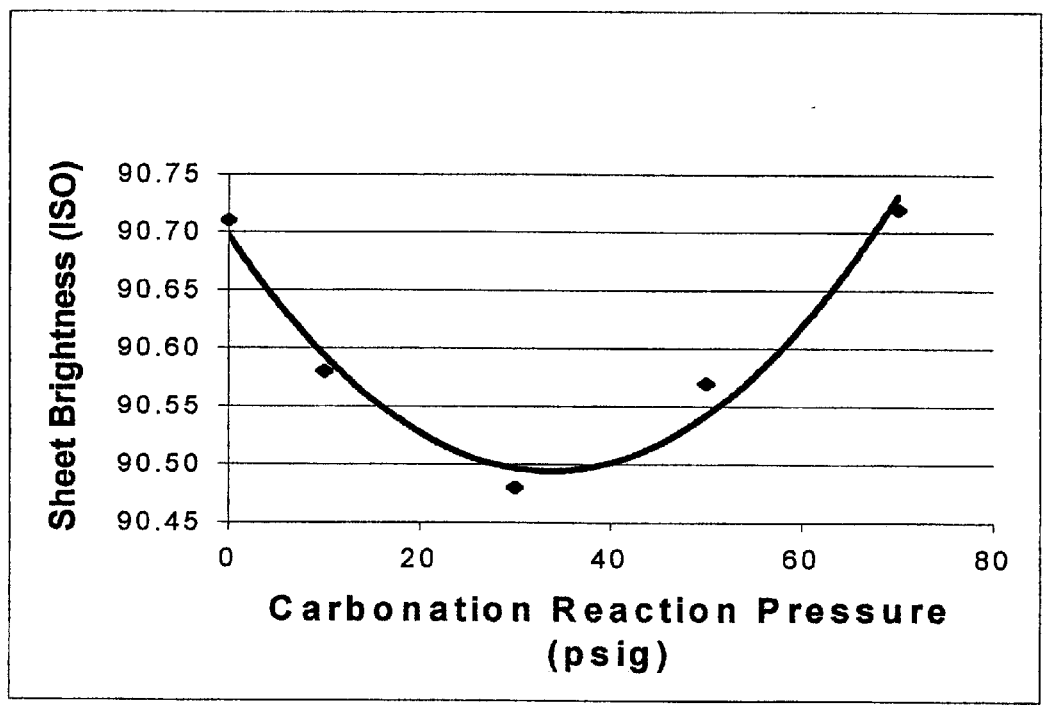
Figure 6: Effect of Carbonation Reaction Pressure on Sheet Brightness
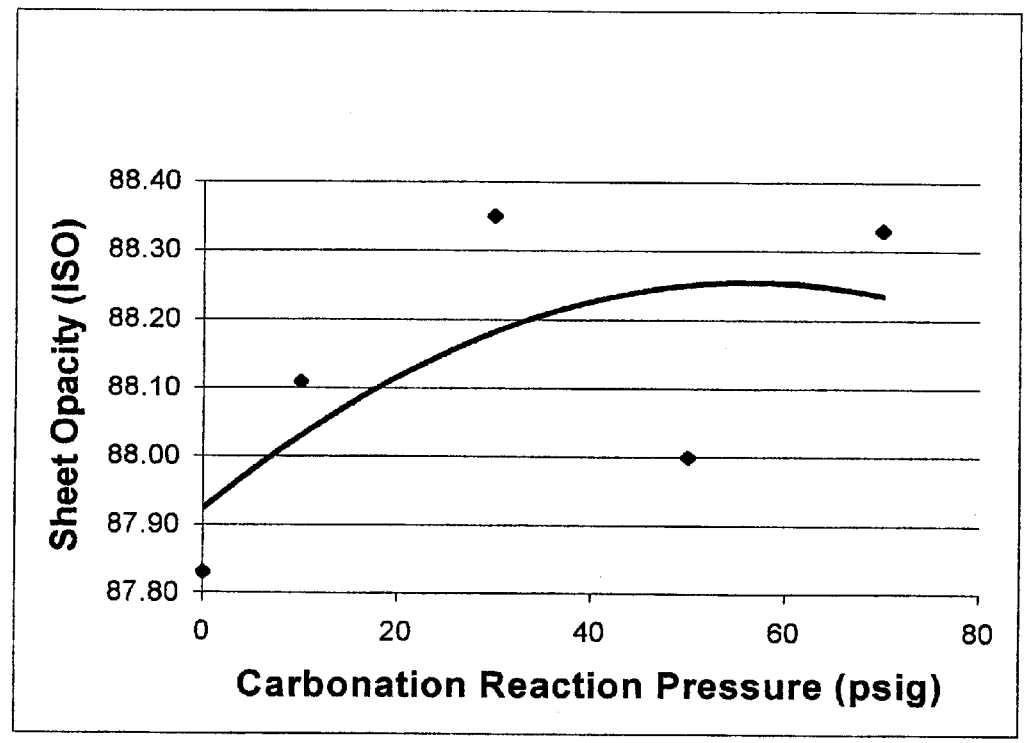
Figure 7: Effect of Carbonation Reaction Pressure on Sheet Opacity

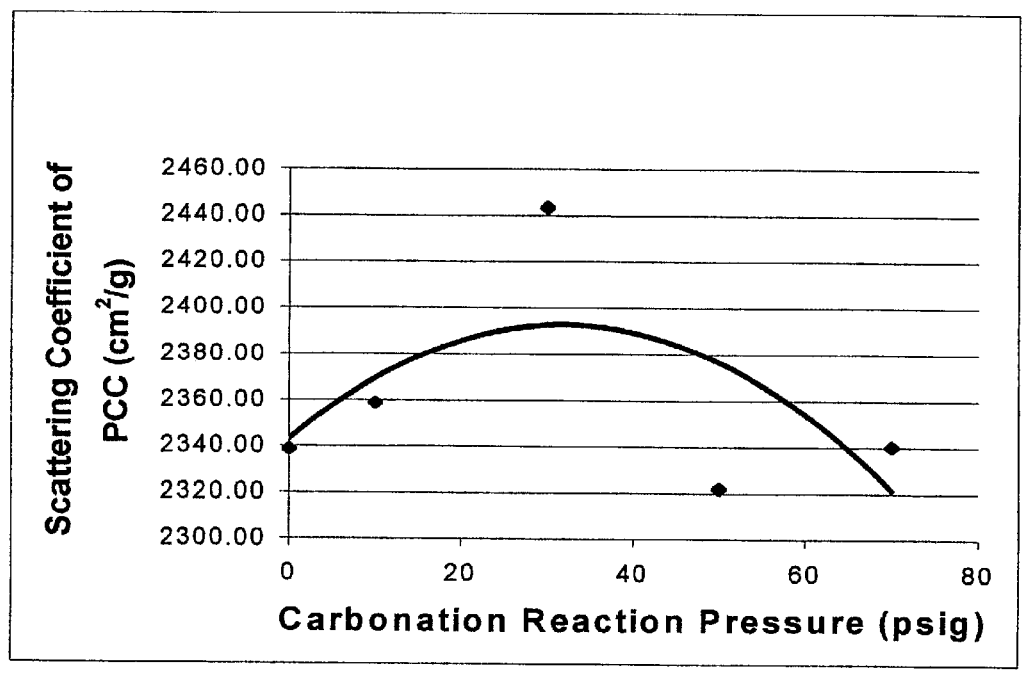
Figure 8: Effect of Carbonation Reaction Pressure on the Scattering Coefficient of PCC

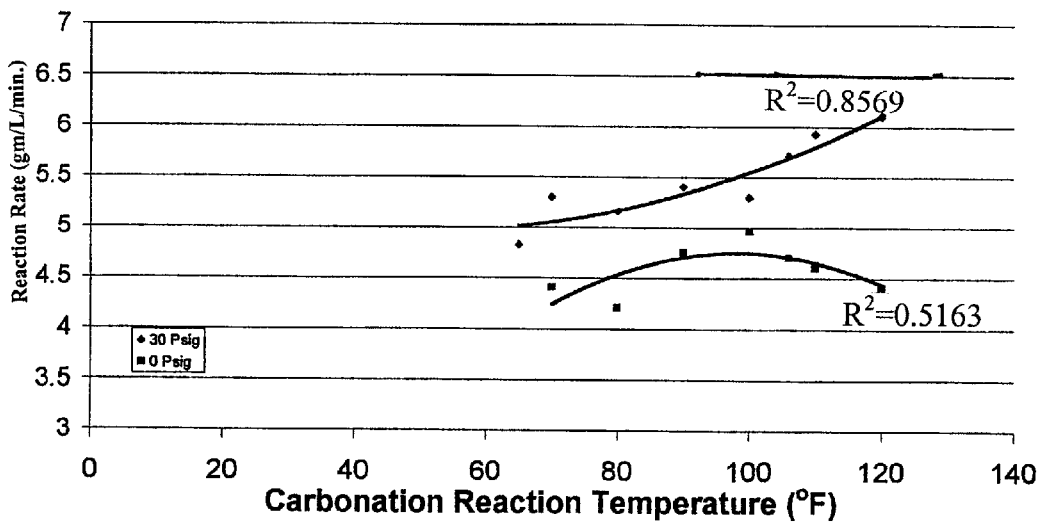
Figure 9: Effect of Carbonation Reaction Temperature on Reaction Rate
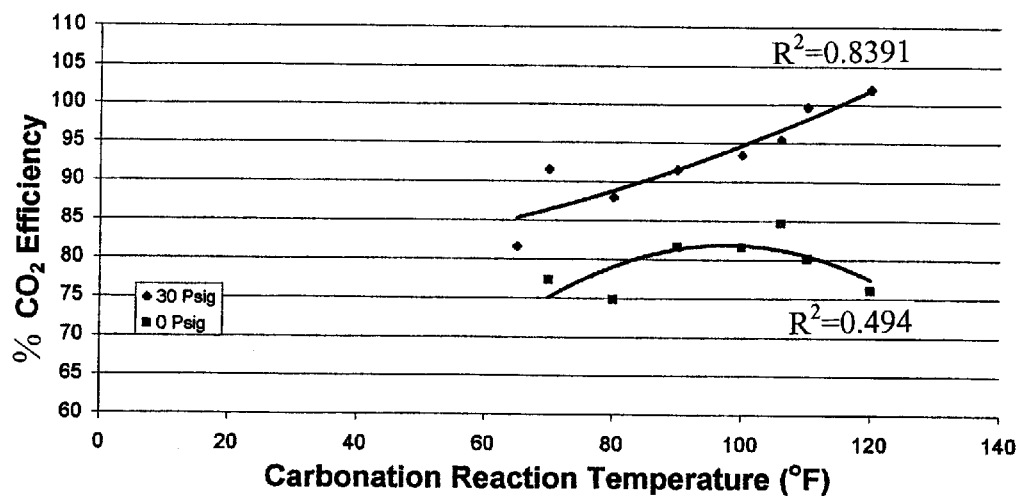
Figure 10: Effect of Carbonation Reaction Temperature on $CO_2$ Efficiency

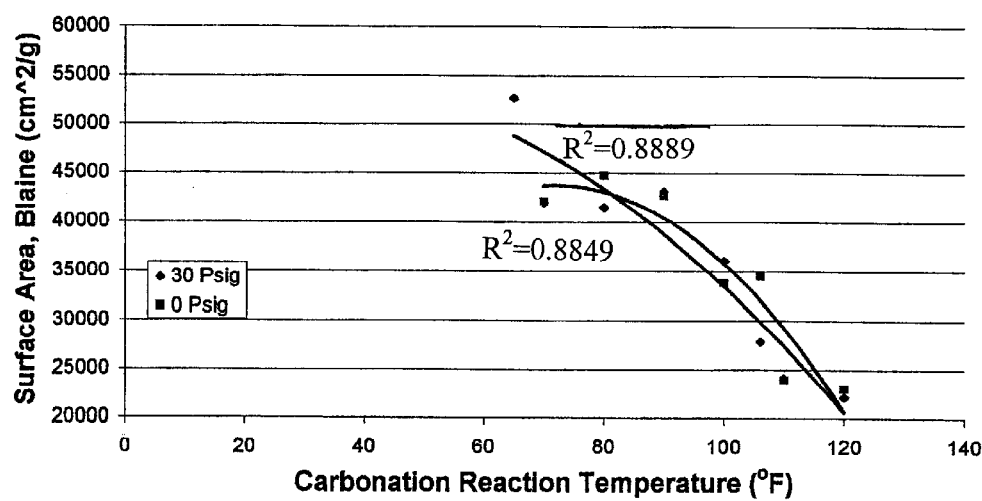
Figure 11: Effect of Carbonation Reaction Temperature on PCC Surface Area

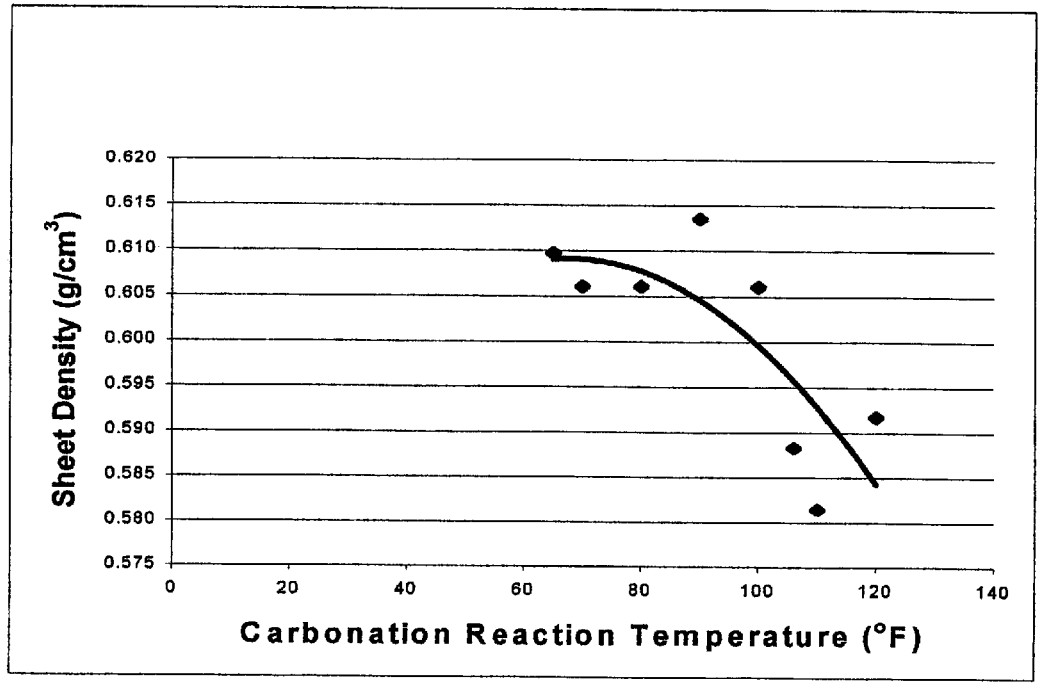
Figure 12: Effect of Carbonation Reaction Temperature on Sheet Density
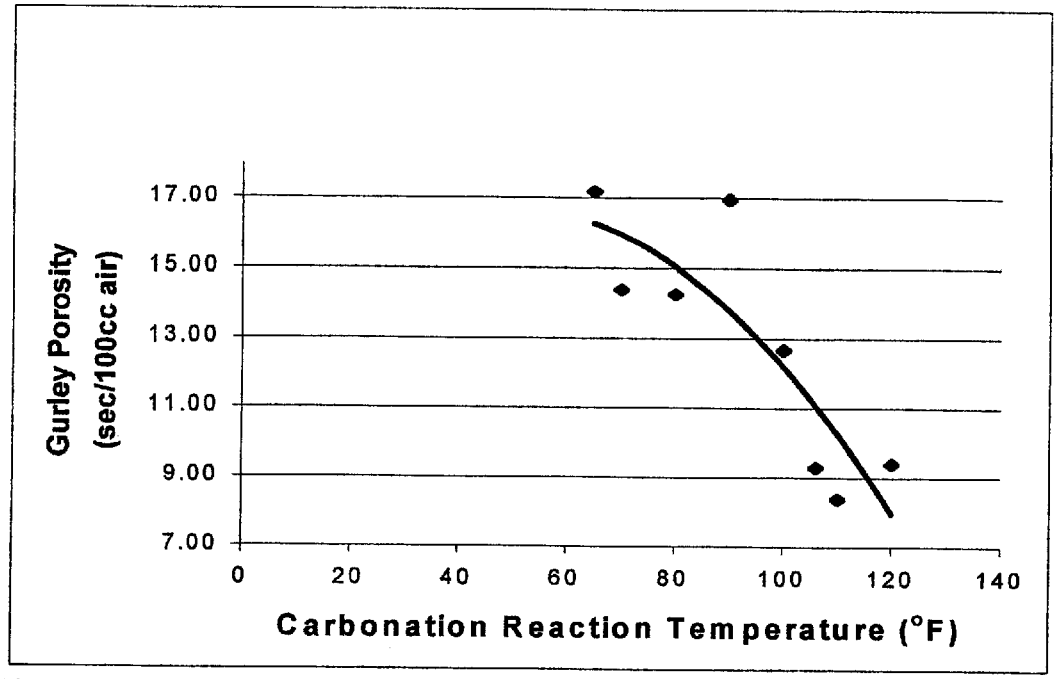
Figure 13: Effect of Carbonation Reaction Temperature on Sheet Porosity

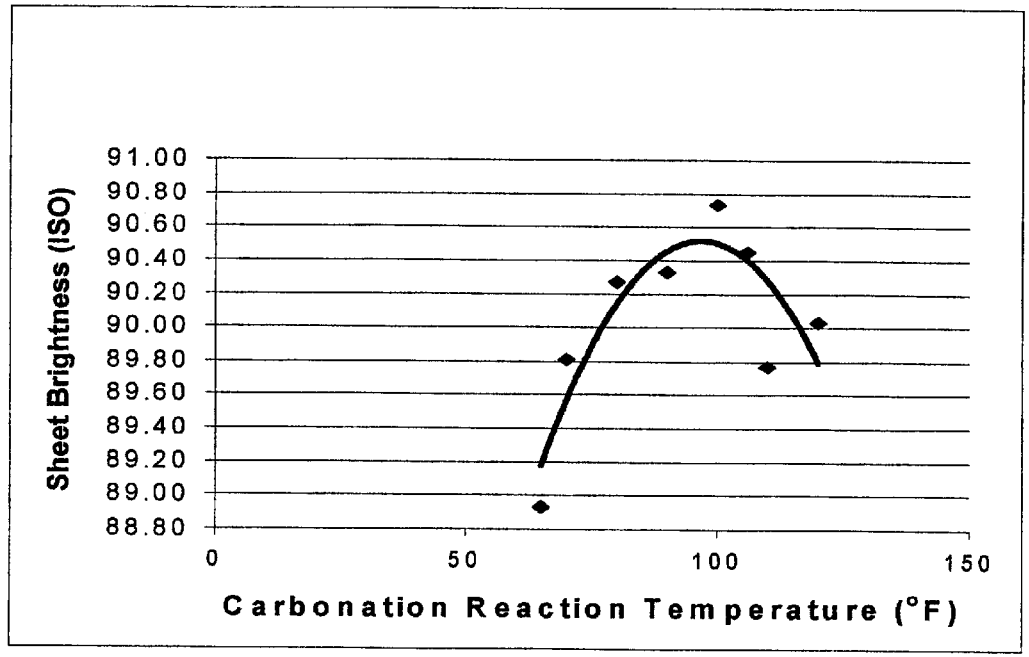
Figure 14: Effect of Carbonation Reaction Temperature on Sheet Brightness
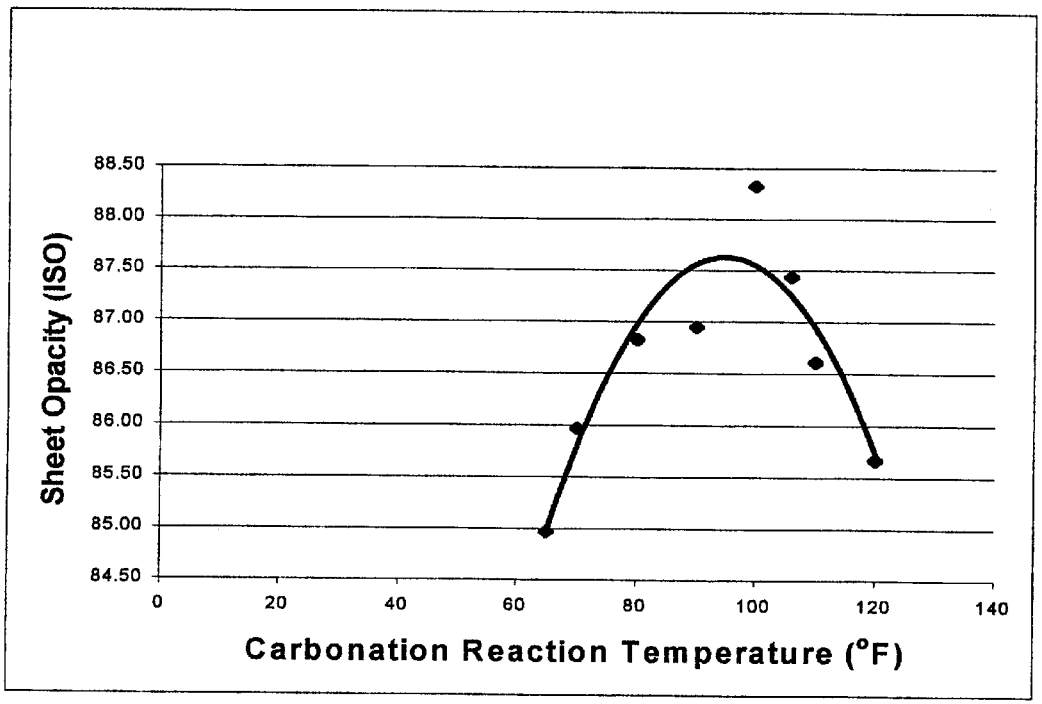
Figure 15: Effect of Carbonation Reaction Temperature on Sheet Opacity

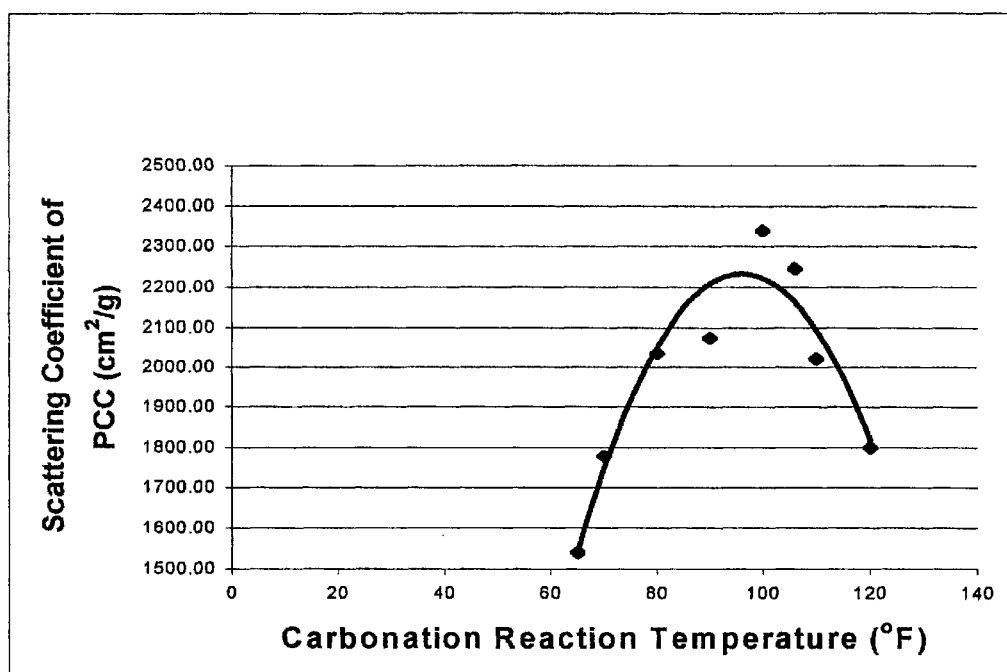
Figure 16: Effect of Carbonation Reaction Temperature on the Scattering Coefficient of PCC

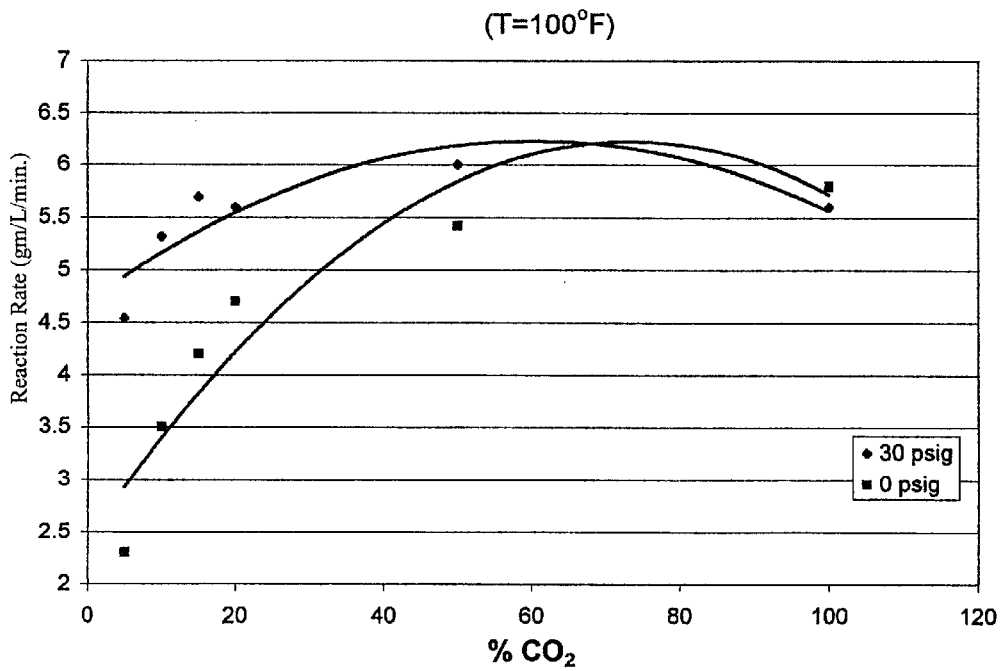
Figure 17: Effect of % $CO_2$ on Reaction Rate
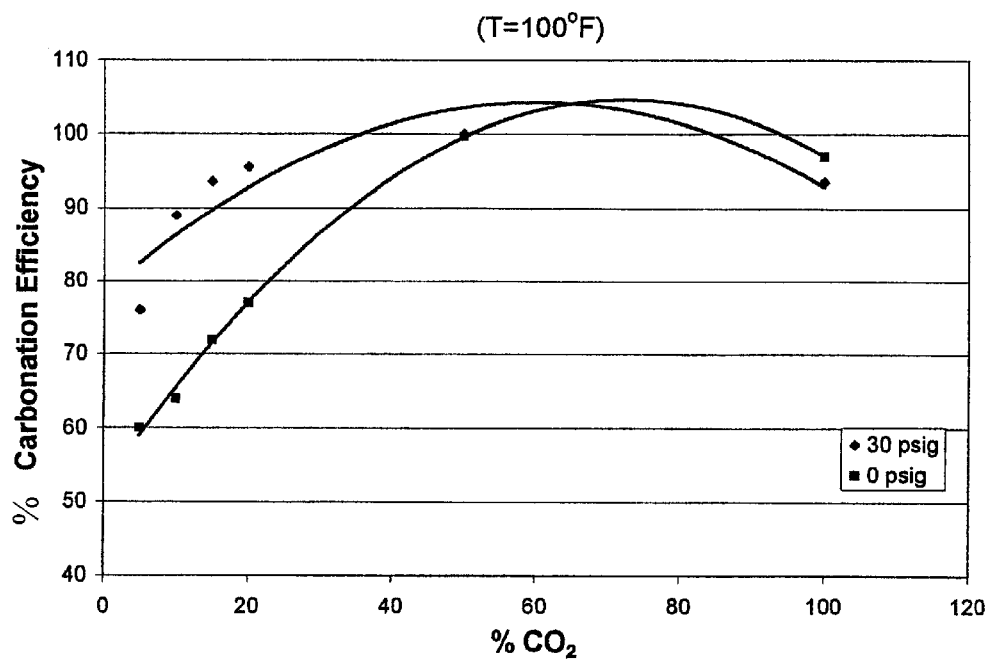
Figure 18: Effect of % $CO_2$ on Carbonation Efficiency

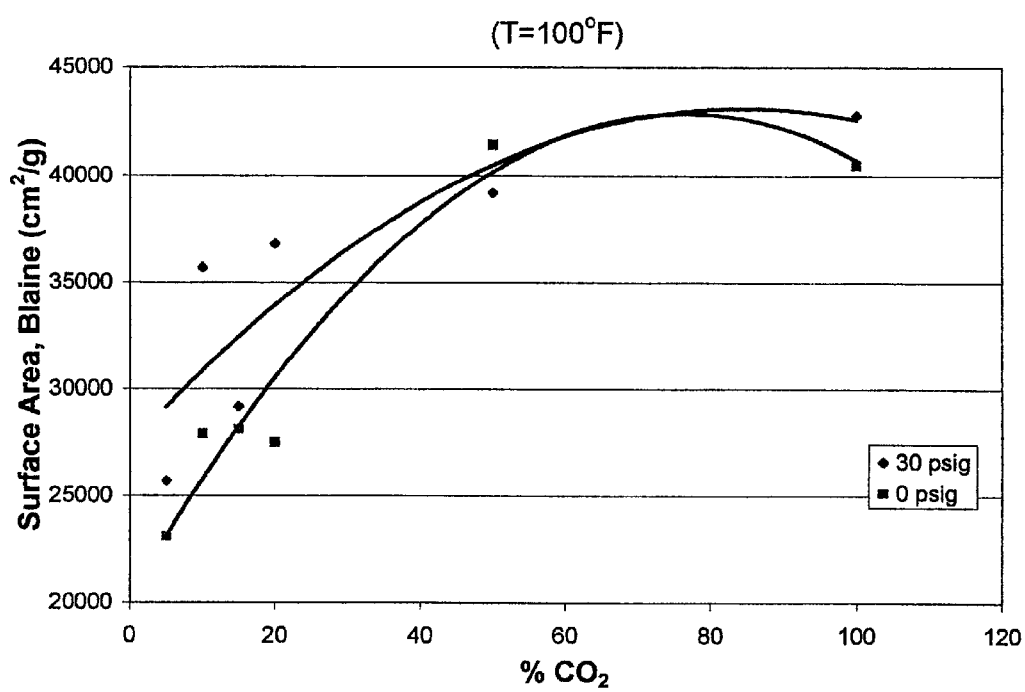
Figure 19: Effect of % $CO_2$ on Surface Area

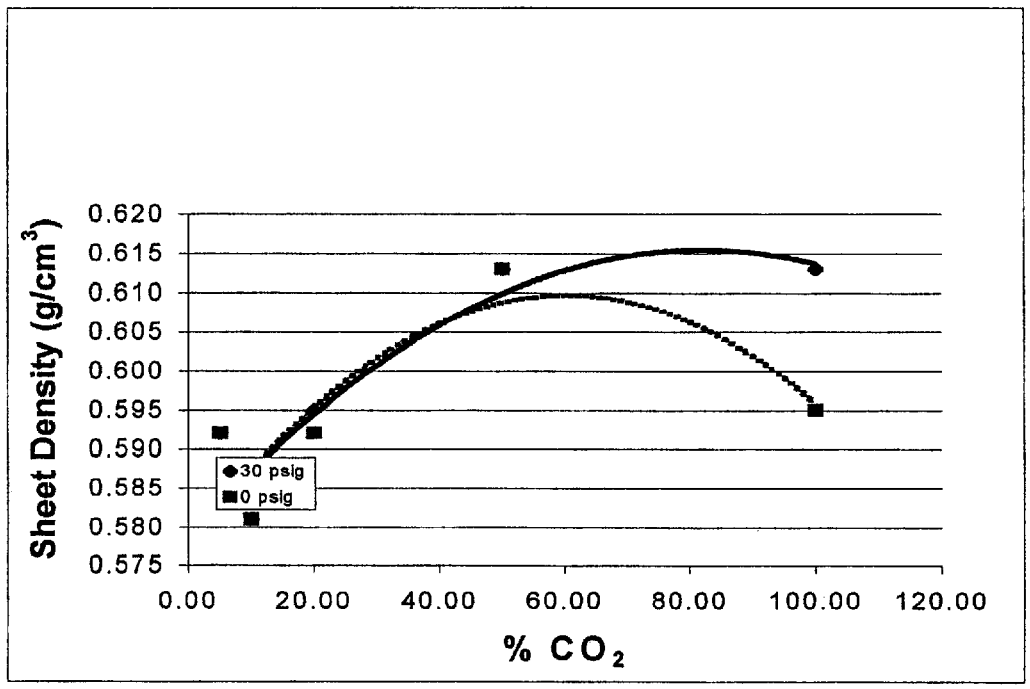
Figure 20: Effect of % $CO_2$ During PCC Formation on Sheet Density
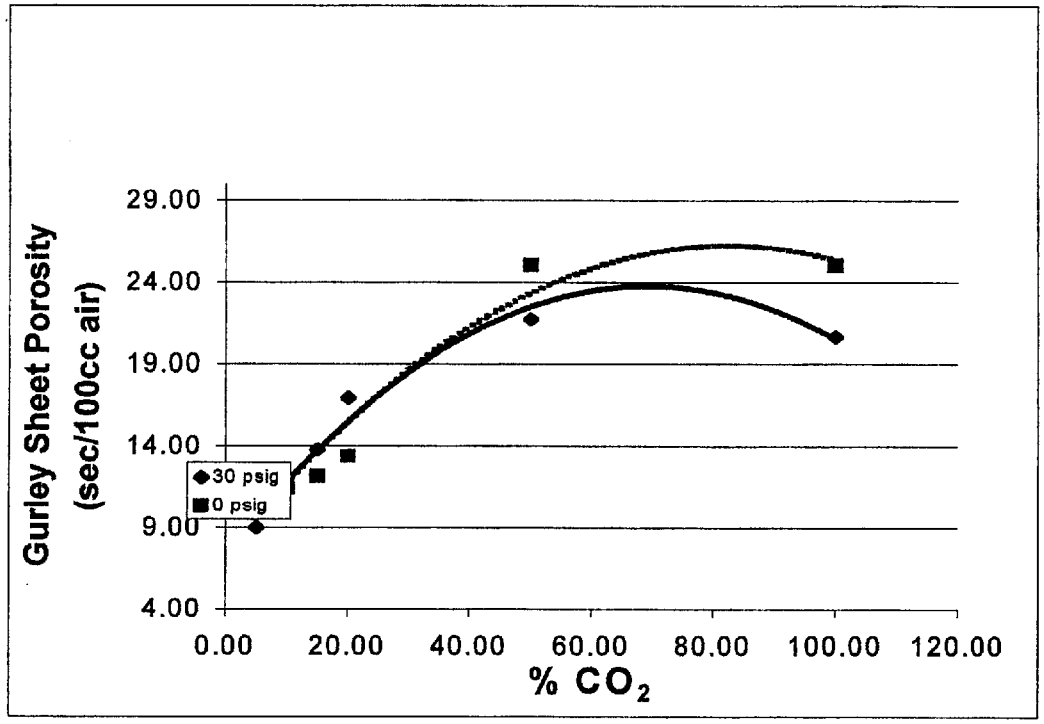
Figure 21: Effect of % $CO_2$ During PCC Formation on Sheet Porosity

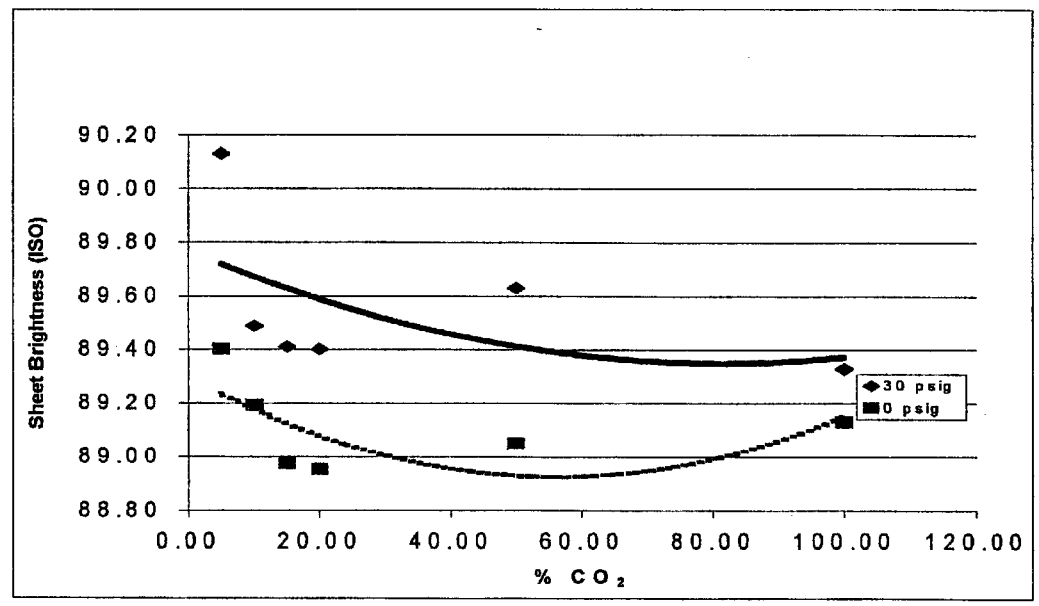
Figure 22: Effect of % $CO_2$ During PCC Formation on Sheet Brightness
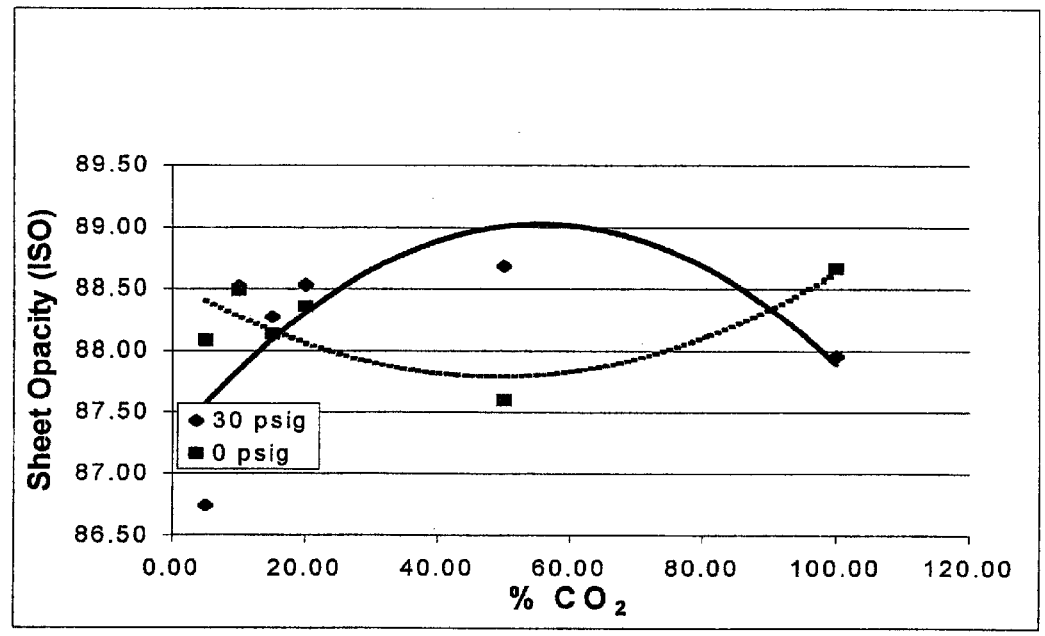
Figure 23: Effect of % $CO_2$ During PCC Formation on Sheet Opacity

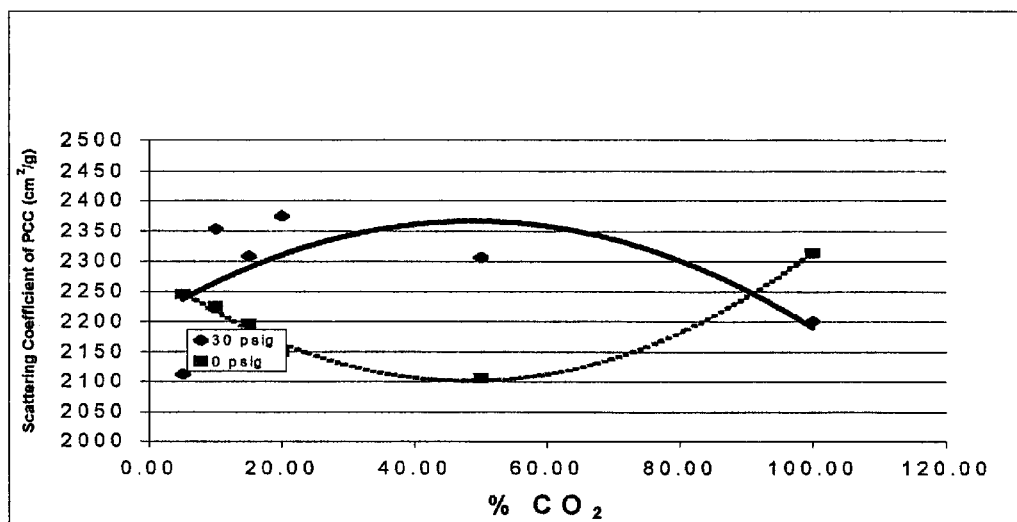
Figure 24: Effect of % $CO_2$ During PCC Formation on the Scattering Coefficient of PCC

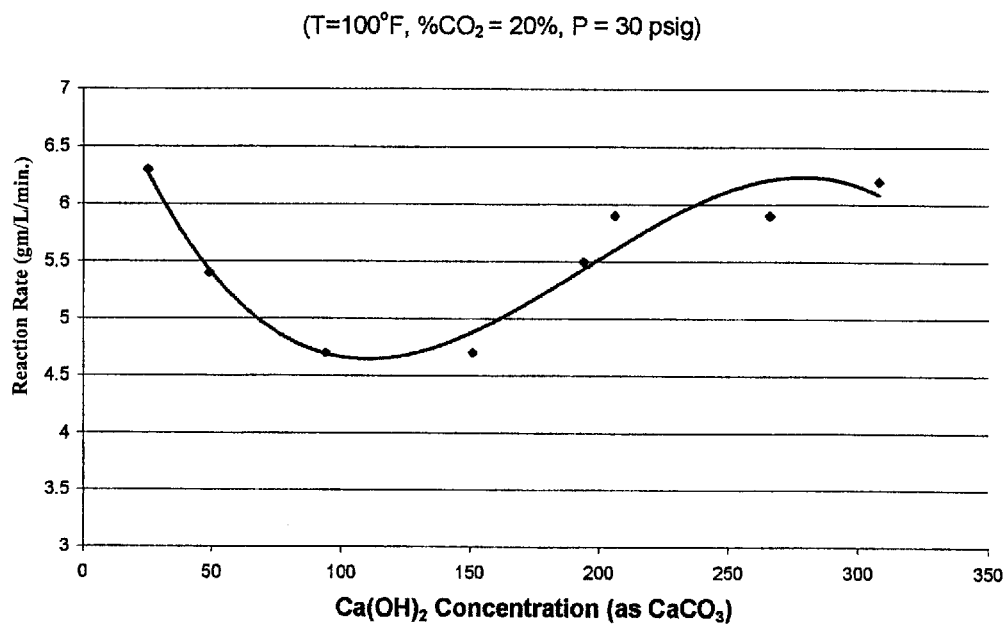
Figure 25: Effect of Ca(OH)$_2$ Concentration on Reaction Rate
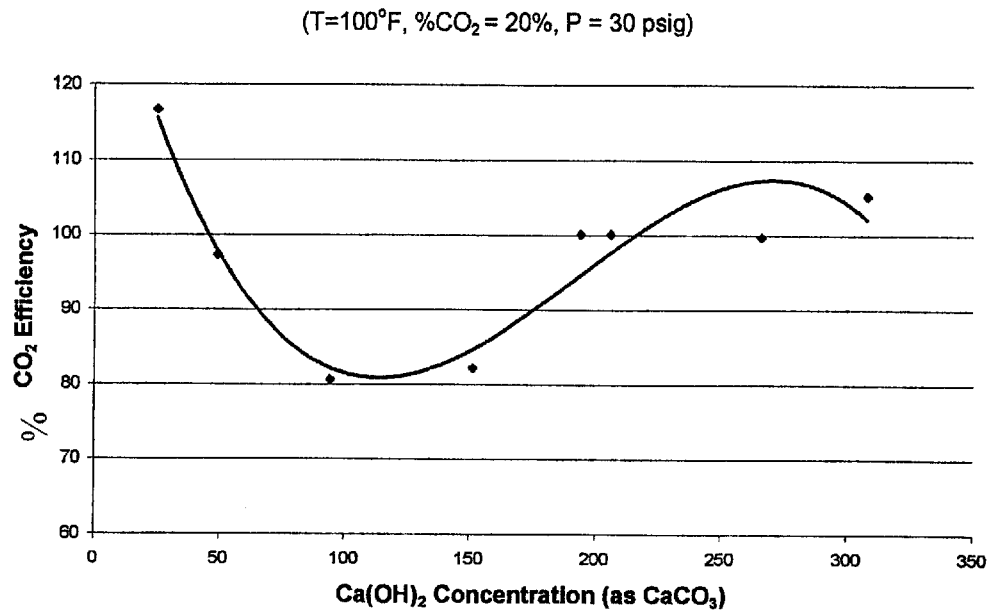
Figure 26: Effect of Ca(OH)$_2$ Concentration on CO$_2$ Efficiency

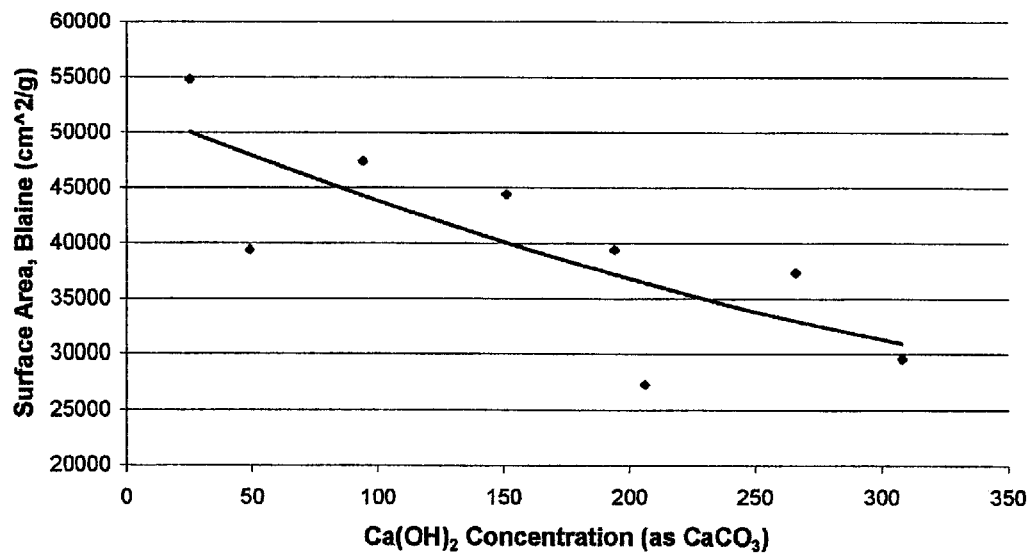
Figure 27: Effect of $Ca(OH)_2$ Concentration on Surface Area

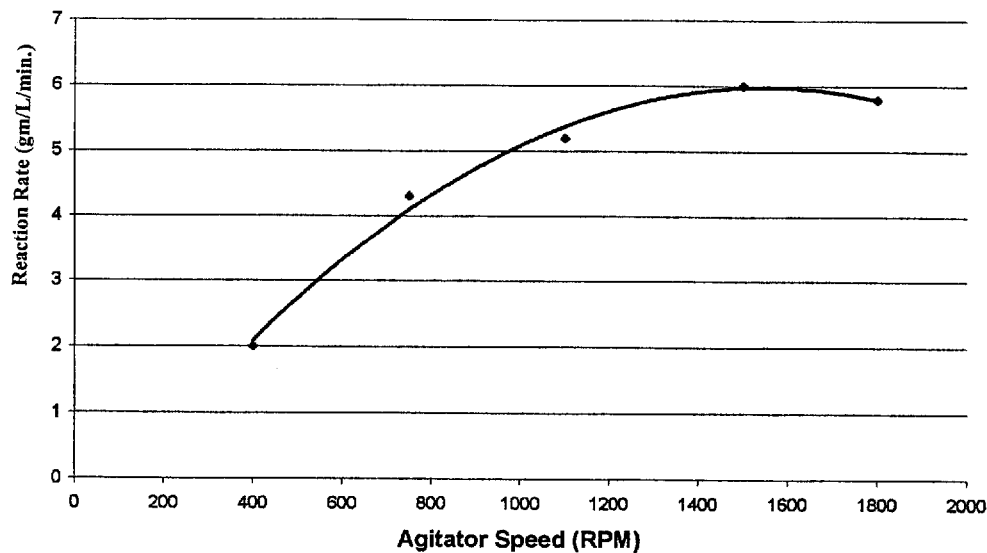
Figure 28: Effect of Agitation on Reaction Rate
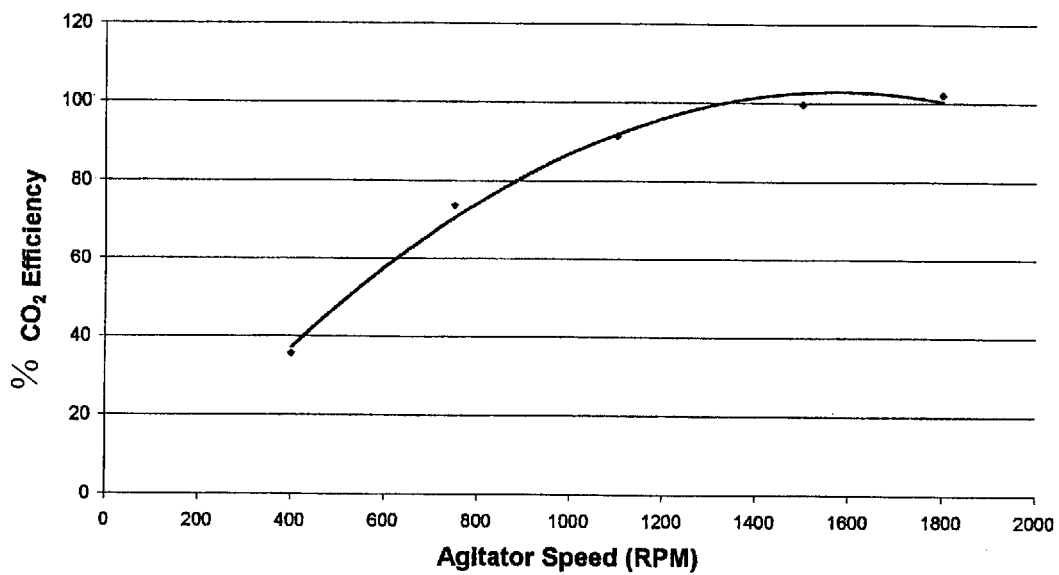
Figure 29: Effect of Agitation on $CO_2$ Efficiency

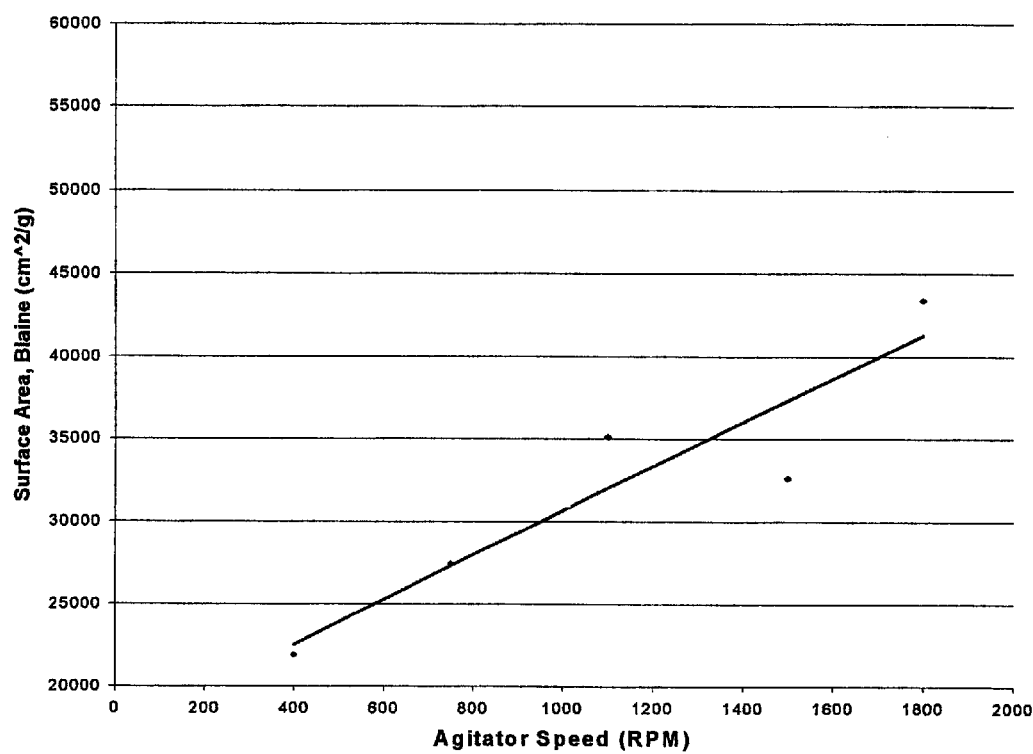
Figure 30: Effect of Agitation on Surface Area

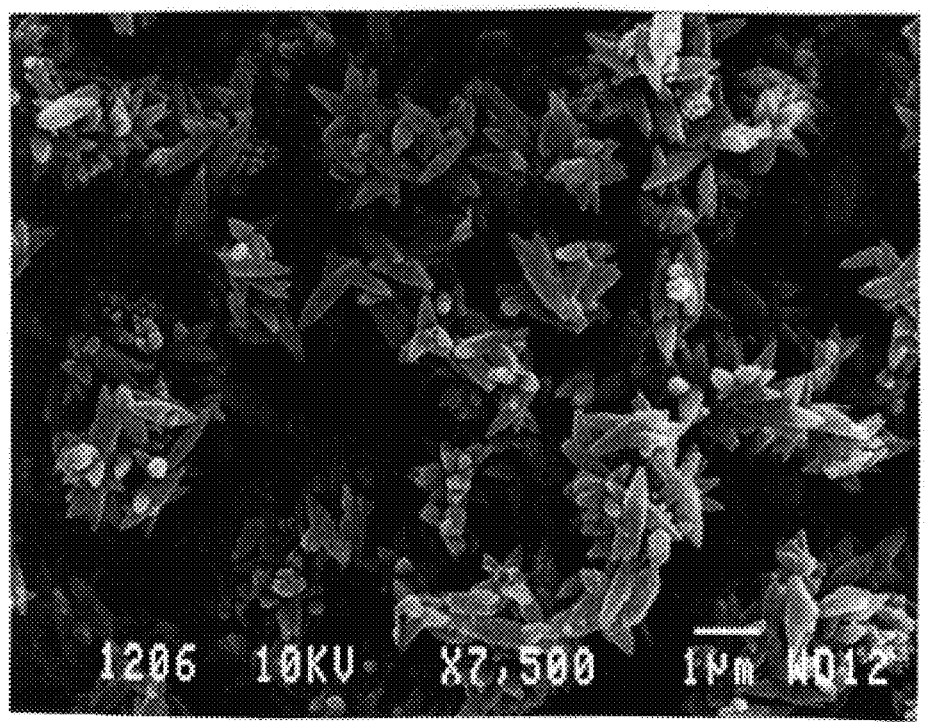
Figure 31: Sclenohedral PCC

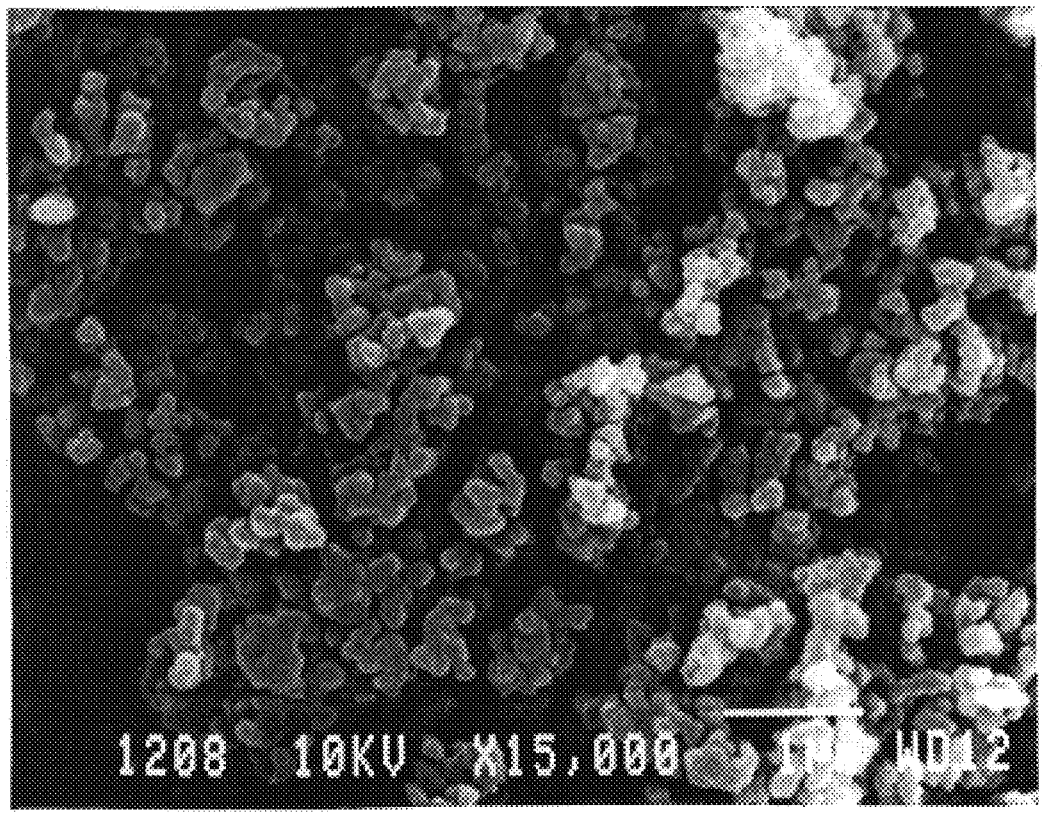
Figure 32: Rhombohedral PCC, Aspect Ratio ~1:1

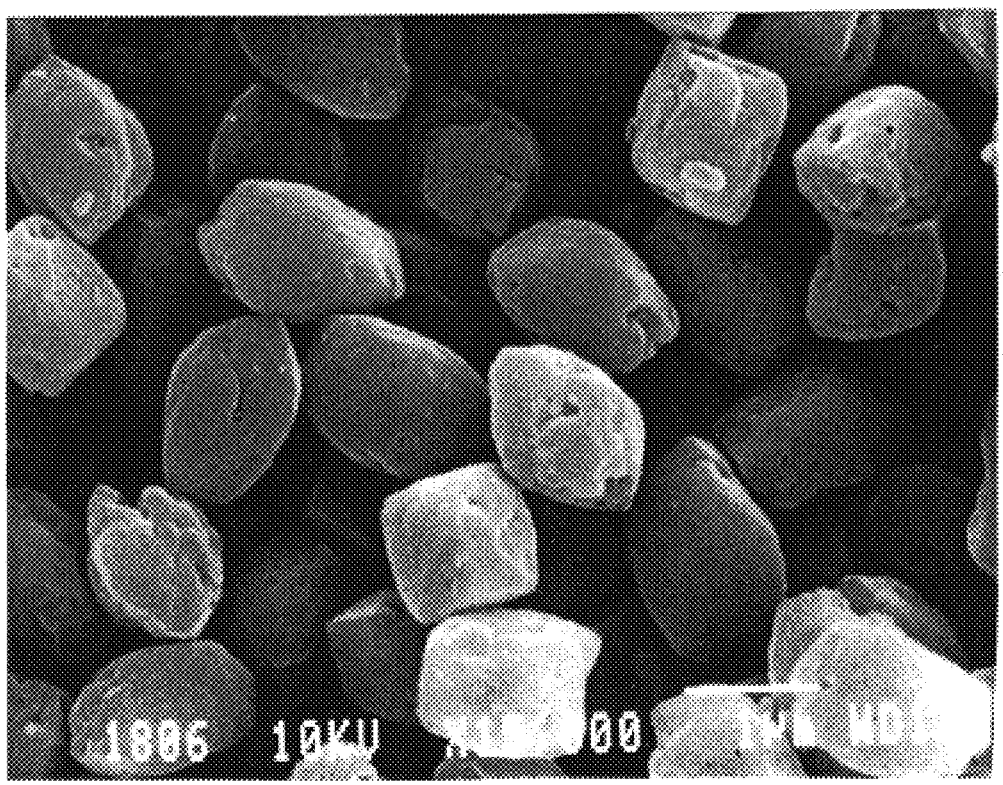
Figure 33: Rhombohedral PCC, Aspect Ratio ~1.1:5

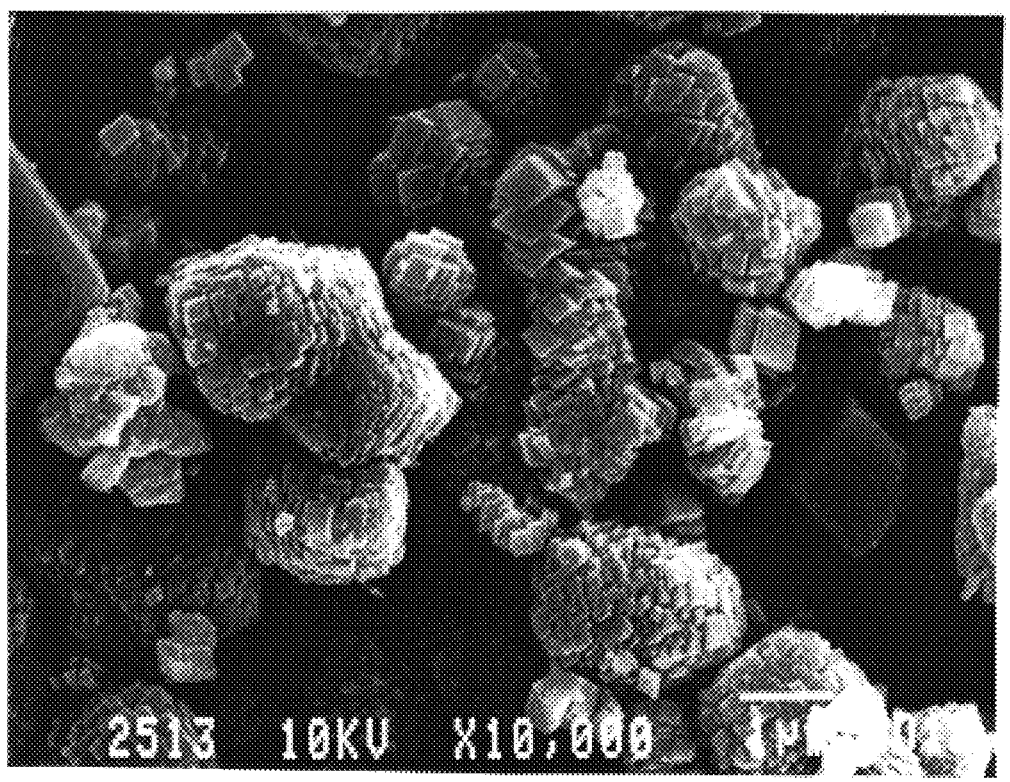
Figure 34: "Stacked" Rhombohedral Crystal Structure

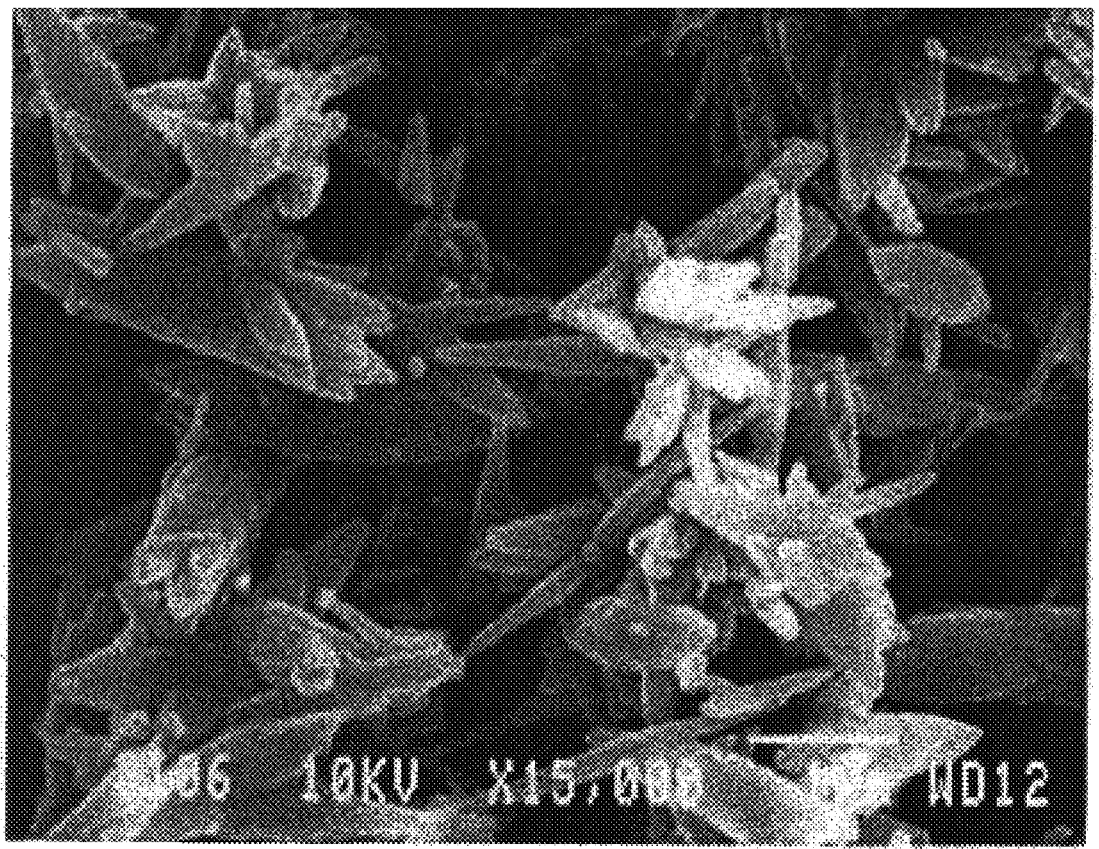
Figure 35: Aragonite Crystal Structure

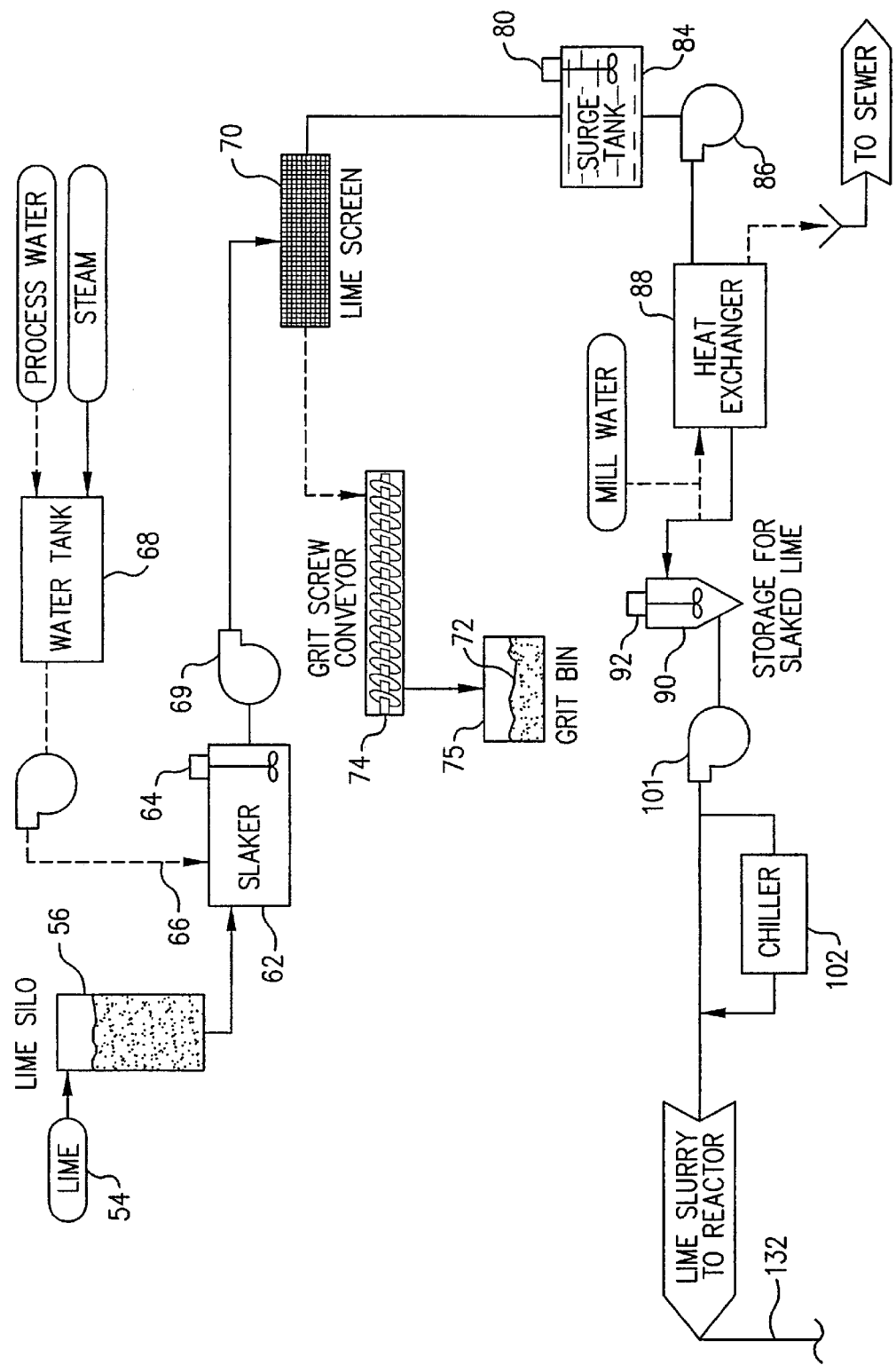
FIG. 36 LIME SLAKING

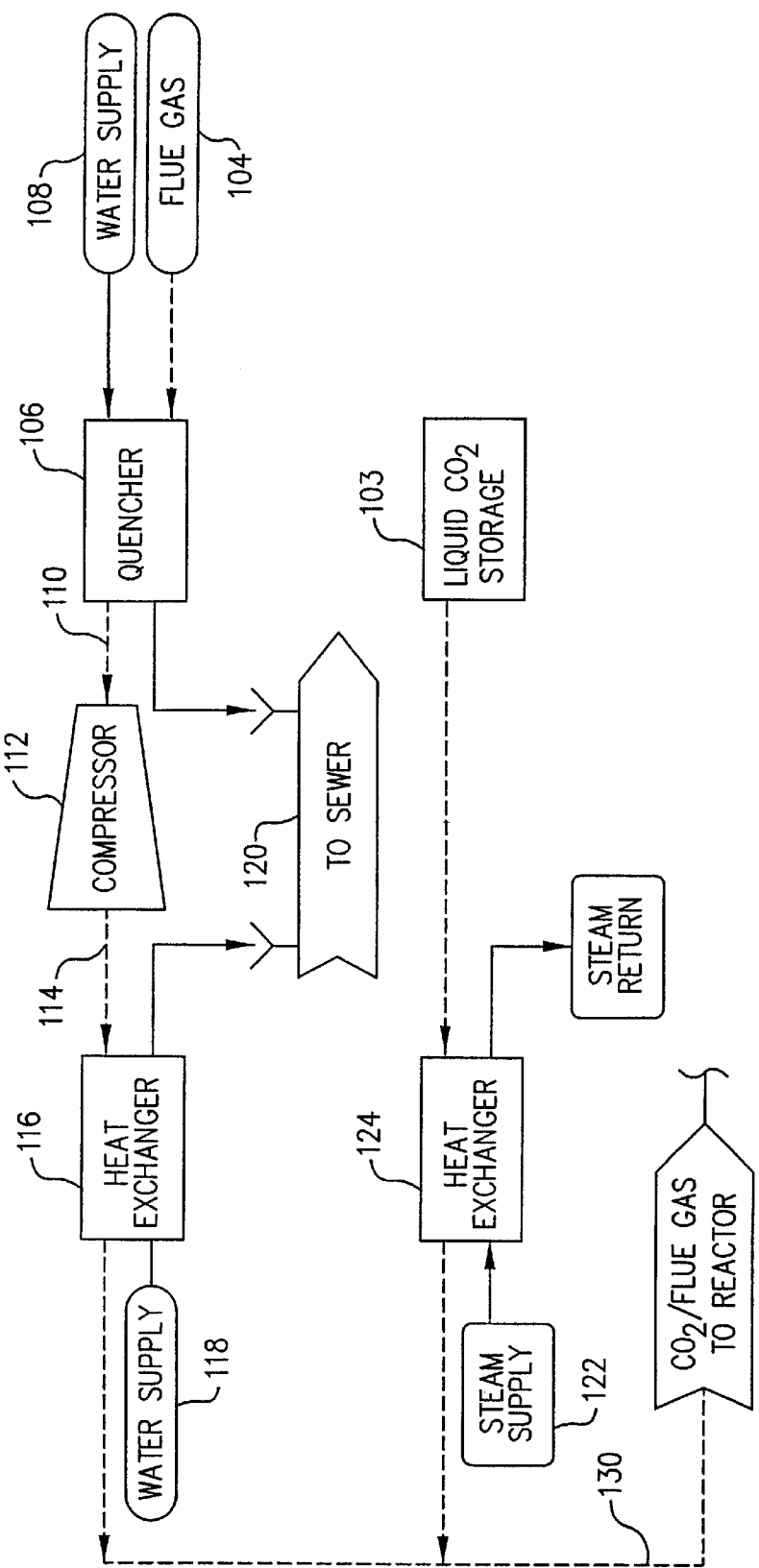

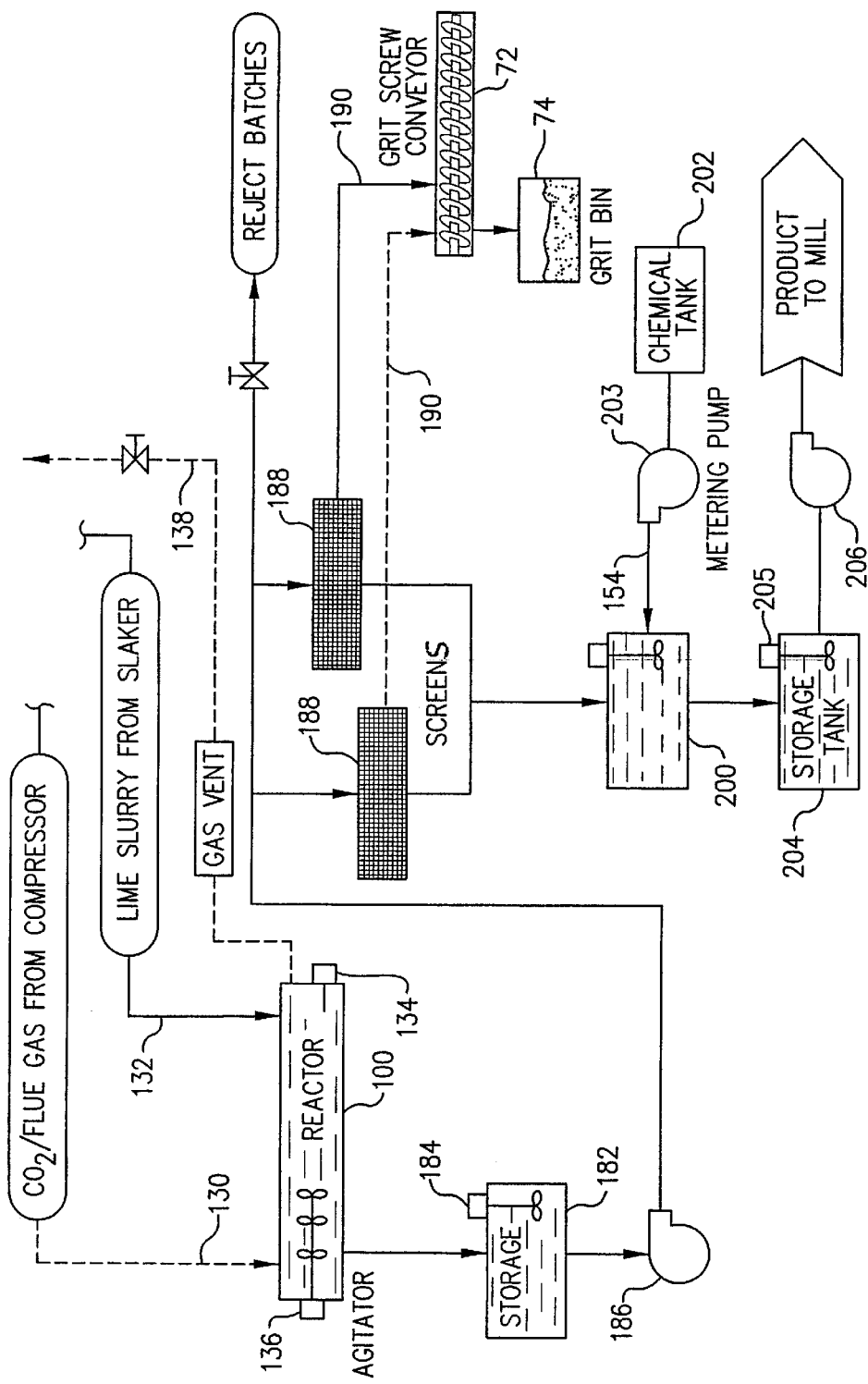
FIG. 38  PRESSURE CARBONATION

HIGH SPEED MANUFACTURING PROCESS FOR PRECIPITATED CALCIUM CARBONATE EMPLOYING SEQUENTIAL PERSSURE CARBONATION

A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention is related to a process for the production of calcium carbonate via precipitation from solubilized calcium ions and carbonate ions, and to the products of the process, and to paper products produced using the products of the process.

BACKGROUND

The manufacture and supply of high quality calcium carbonate for paper filler and for paper coatings is now widely practiced around the world. Relatively recently, particularly as alkaline papermaking has become popular, the on-site manufacture of precipitated calcium carbonate ("PCC") from aqueous solutions in atmospheric tanks has also been developed and implemented at a variety of locations. These on-site plants have developed because transportation costs of either a dry powder or of a liquid slurry of calcium carbonate was generally prohibitive. However, the variability of product quality from the heretofore-employed on-site PCC plants has been problematic at times. Such problems are especially acute in those locales where relatively impure sources of carbon dioxide have been employed, such as from boilers burning a variety of solid or liquid waste fuels. Also, the particle size distribution of the PCC obtained from various prior art processes has been less than optimum, and consequently, it would be advantageous to provide a process in which the particle size distribution could be more effectively controlled.

In processes employed for the manufacture of precipitated calcium carbonate, several fundamental chemical reaction steps are normally employed, which steps can be generally summarized as follows:

(1) Calcination—heating limestone (calcium carbonate) and driving the carbon dioxide out, resulting in the formation of lime (calcium oxide).

(2) Slaking—reacting lime with water to form a lime slurry (calcium hydroxide; $Ca(OH)_2$); this reaction is accompanied by the evolution of heat.

(3) Carbonation—reacting the lime slurry with carbon dioxide so that the solubilized calcium from the calcium hyroxide is reacted with the carbonate produced by bubbling the carbon dioxide in water, to form the desired calcium carbonate; this reaction is also exothermic.

Various prior art techniques disclose methods of preparing different PCC crystal morphologies, shapes, sizes, and size distribution of for the precipitated calcium carbonate. Although the prior art known to me teaches the use of process variables such as carbon dioxide concentration, calcium hydroxide concentration, temperature, and the use of chemical additives, none of such prior art processes known to me utilizes the step of carbonation under pressure, either alone or in combination with other heretofore utilized variables, as a technique for increasing the reaction rate, carbonation efficiency, or for making finer PCC particles. The prior art has also not employed pressurization of the carbonation reaction as a method for increasing the rate of formation of carbonate and calcium ions, the formation of which (and especially the latter) are the primary limitation in increasing the rate of carbonation reaction.

Moreover, the various prior art methods utilized for production of precipitated calcium carbonate in papermaking operations can be characterized in that the carbonation reaction has been carried out in an atmospheric pressure vented or open vessel. This means that the partial pressure of carbon dioxide available in the carbonation reactor has been limited based on the concentration of carbon dioxide available in an incoming gas stream.

It is in the carbonation reaction that the soluble calcium from the calcium hydroxide is converted to calcium carbonate. Then, more solubilization of the calcium ion takes place as the calcium hydroxide (lime slurry) is dissolved, and this proceeds until all of the available calcium hydroxide is converted into calcium carbonate. In this reaction, the reaction rate of calcium ions combining with carbonate ions is almost instantaneous. Consequently, the slow kinetic step which controls the overall reaction rate is believed to be the rate of dissolution of calcium hydroxide in the lime slurry, so that calcium ions are available for reaction. In conventional industrial processes for the manufacture of calcium carbonate, a slurry of approximately 200 gm/L of calcium hydroxide placed in an atmospheric reactor, and a gas containing from about 15% to about 20% by volume of carbon dioxide is bubbled through the slurry. In general, such prior art processes have a reaction rate such that calcium carbonate is formed at the rate of from about 0.5 grams per liter of slurry per minute to about 1.5 grams per liter of slurry per minute. Thus, for a batch charge of 200 grams per liter of calcium hydroxide, about 200 minutes is required to complete the reaction, per liter of slurry.

In general, the currently utilized manufacturing processes are slow, with low carbonation efficiencies. Thus, manufacturing plants utilizing such prior art processes require large equipment, resulting in high capital costs per unit of calcium carbonate production.

Relatively recently, approximately eighty percent (80%) of the world paper production has been converted to an alkaline papermaking process. In that process, precipitated calcium carbonate ("PCC") is employed as the primary filler. An average papermill may require from about 20,000 to about 100,000 tons per year of PCC. To meet such demands, the production of PCC has shifted from off-site to on-site. One important advantage of on-site PCC production has been the saving of transportation costs. Also, a primary raw material for PCC production, namely carbon dioxide, is available free at many mills, as a waste product from lime kiln flue gas. Such gas normally contains from about twelve percent to about twenty five percent (12%–25%) of carbon dioxide. However, one limitation encountered was that variability and fluctuation in the carbon dioxide concentration in the flue gas produced variability in the resulting PCC. Moreover, some mills do not have lime kilns, and free on-site sources of carbon dioxide are limited to flue gas from gas fired boilers, which only have seven to ten percent (7–10%) carbon dioxide concentration. In such situations, it has not heretofore been economical to place an "on-site" PCC plant at the mill location.

Thus, in order to manufacture large quantities calcium carbonate as required in papermaking operations, it has heretofore been necessary to provide very large reactors (for example, reactors in the 18,000 gallons to 20,000 gallons range are common). Thus it is evident that it would be desirable to provide a process in which the overall production rate of calcium carbonate is increased, thereby reducing the reactor size for a desired PCC production rate. It would also be advantageous to develop a process which (a) can utilize low CO2 containing gas, and (b) in which the effects of fluctuation in CO2 concentration on particle size distribution of PCC can be minimized.

Several prior art processes are known which superficially resemble portions of my process to some limited extent. In U.S. Pat. No. 3,304,154 issued on Feb. 14, 1967 to Dimitrios Kiouzes-Pezas for a Process for Producing Spheroidal Alkaline Earth Metal Carbonates, carbon dioxide gas is bubbled through a cylindrical autoclave reactor having a calcium hydroxide suspension therein. Pressure in the reactor was accumulated until a pressure from about 4 to 6 atmospheres gauge, and preferably about 5 atmospheres gage, was built up. Then, the reactor was rotated, while keeping the temperature between 60° to 90° Centigrade. However, that process has some practical limitations and thus is not well suited to the on-site production of PCC. First, it is difficult to produce the needed quantities (up to 100,000 tons per year) from such reactors, and starting at the low calcium hydroxide concentrations taught therein. Second, the process only produces spheroidal crystal structures. Finally, the rotation of the reactor presents various practical mechanical problems, and would result in undesirable cost and expense.

In U.S. Pat. No. 5,164,006 issued on Nov. 17, 1992 to Vasant Chapnerkar et al, for a Method for Preparing Acid Resistant Calcium Carbonate Pigments, gaseous carbon dioxide is added to a slurry of calcium hydroxide under atmospheric conditions. This conventional prior art process has a calculated reaction rate of approximately 1.0 grams per liter of slurry per minute, to produce a PCC product having a sclenohedral crystal habit with a surface area of 27,000 $cm^2$/gram (Blaine method). However, pressure carbonation was not utilized in that prior art process.

In U.S. Pat. No. 5,215,734 issued on Jun. 1, 1993 to Charles Kunesh et al, for Rhombohedral Calcium Carbonate and Accelerated Heat-Aging Process for the Production Thereof, a method of hydro-thermal post treatment of PCC is described. In that process, PCC produced under conventional process conditions is "heat aged" in a hydrothermal bomb at temperatures of up to 300° C. for from 1 to about 24 hours, to cause the crystal structure to change to a rhombohedral PCC having a surface area of from about 3 to about 15 $m^2$/gram. So, this prior art technique uses conventional atmospheric PCC production, at relatively low reaction rates, before pressurization is utilized.

In summary, there continues to be a need for a high efficiency, simple method of production of PCC that is capable of efficiently producing large quantities of precipitated calcium carbonate. And, it would be advantageous to be able to employ such a process for on-site production of PCC at locations where only relatively dilute gas streams containing low percentages of carbon dioxide are available. Finally, it would be advantageous to employ such a process with flexible manufacturing capability, so that desired crystal shapes and sizes can be produced when and where required to meet the manufacturing requirements of a paper mill. Importantly, it would be desirable that PCC produced from a new method of on-site production of PCC would improve the properties of paper produced when utilizing the product from such a novel PCC manufacturing process.

OBJECTS, ADVANTAGES, AND NOVEL FEATURES

My novel manufacturing process for producing precipitated calcium carbonate can be advantageously applied to a variety of paper mill or manufacturing plant locations. This is because my process can advantageously employ low concentrations of carbon dioxide in reaction gas, such as may be found in stack gas from package boilers, or from other "low grade" carbon dioxide sources. My novel process is simple, easily applied to automated manufacturing process methods, and is otherwise superior to those PCC manufacturing methods heretofore used or proposed.

From the foregoing, it will be apparent to the reader that one important and primary object of the present invention resides in providing an improved method for producing precipitated calcium carbonate.

Another objective of my process, and of the apparatus for carrying out the process, is to simplify the manufacturing procedures, which importantly, simplifies and improves quality control in the manufacture of high purity precipitated calcium carbonate.

Another objective of my process is to produce a novel, high purity, uniformly sized, calcium carbonate product via use of the process Other important but more specific objects of the invention reside in the provision of an improved manufacturing process for the manufacture of precipitated calcium carbonate, as described herein, which:

significantly increases the rate of the carbonation reaction and thus the production of precipitated calcium carbonate;

significantly reduces the size of equipment and the building, thus reduces capital costs of on-site plants;

increases the efficiency of carbon dioxide utilization, or carbonation efficiency;

utilizes low concentration carbon dioxide sources, so that it can be effectively applied in a variety of locations where on-site precipitated calcium carbonate production has not heretofore been economically feasible;

provides a low cost precipitated calcium carbonate;

reduces the effect of fluctuations in CO2 concentration in flue gas and thus provides a high degree of particle size uniformity, to met optical quality requirements for use in paper manufacturing operations;

provides a high quality precipitated calcium carbonate for filler in alkaline papermaking;

provides a high degree of particle size uniformity, to meet optical quality requirements for use in paper manufacturing operations;

enables the production of a variety of distinct crystal morphologies, including calcite scalenohedral, calcite rhombohedral, and aragonite;

enables the efficient production of small calcium carbonate crystals;

enables process control to be established using reliable and batch reproducible process parameters, thus enhancing quality assurance;

enables the lime slaking production rate to be matched with the precipitated calcium carbonate production rate, thus significantly increasing operating rates and thereby reducing equipment size requirements;

Other important objects, features, and additional advantages of my invention will become apparent to the reader from the foregoing and from the appended claims and the ensuing detailed description, as the discussion below proceeds in conjunction with examination of the accompanying drawing.

SUMMARY

I have now invented, and disclose herein, a novel process for the manufacture of precipitated calcium carbonate ("PCC"). This manufacturing process does not have the above-discussed drawbacks common to heretofore-employed on-site PCC production methods of which I am aware. The process increases the carbon dioxide utilization efficiency, and thus overcomes the heretofore-encountered shortcomings with respect to utilization of gas streams containing low concentrations of carbon dioxide. Also, it enables effective process control, providing a method for creating relatively uniform particle sizes, and thus reliably controlling crystal quality. And, because the PCC production rate and the lime slaking rate can be effectively matched, the equipment employed in the process achieves a high utilization rate, thus decreasing capital costs on an installed cost per unit of production capacity basis.

My method for the production of precipitated calcium carbonate involves providing lime, either as calcium oxide or calcium hydroxide, and mixing the calcium oxide or calcium hydroxide with a solvent until a calcium hydroxide slurry is formed, with the slurry containing an undissolved solute comprising a calcium containing molecule, preferably calcium hydroxide, and a solution comprising calcium ions. Preferably, the solvent is water, and an aqueous slurry is provided by slaking the lime. Also, lime slurry can be manufactured in batches that are sized to match a desired charge volume for a carbonation reactor, or more preferably, the lime slurry can be continuously manufactured. In this way, a sequential or semi-continuous operation can be provided wherein lime slaking is matched to utilization of a slurry in a carbonation reaction batch. The lime slurry is charged to the carbonation reactor, which reactor is maintained at a pressure above the prevailing atmospheric pressure at the plant locale, while passing a gas stream containing carbon dioxide through the reactor. Carbonate ions are produced from dissociation or dissolution of the carbon dioxide in aqueous slurry, which carbonate ions react with calcium ions available from the solution carrying the lime slurry, to form a calcium carbonate precipitate. In a preferred embodiment, the lime slurry is fed to the carbonation reactor at a pH of 12 or more, and the carbonation reaction is carried out until substantially all available calcium is reacted, as indicated by reduction in pH to a pre-selected endpoint, which occurs when no further hydroxide ions become available via solvating of calcium hydroxide. When the desired endpoint pH is reached, which endpoint is normally at least as low as 8.5, the precipitated calcium carbonate is discharged from the carbonation reactor, and thereafter, another lime slurry charge is fed to the reactor, and the carbonation reaction is resumed. For commonly encountered temperatures and pressures, such as normal temperature and pressure (25° C. and atmospheric pressure) the lime slurry (at about 200 grams per liter) comprising calcium ions contains about 1.6 grams per liter of soluble calcium hydroxide, as ion. Preferably, the carbonation reaction is carried out in a continuous stirred tank reactor with a high shear mechanical mixer, in order to increase the reaction rate.

In my novel process, the partial pressure of carbon dioxide available for the carbonation reaction is increased by way of pressurization of the incoming gas stream to the carbonation reactor. This can normally be conveniently accomplished by quenching (cooling) and scrubbing an available stack gas, and then compressing the cleaned and cooled incoming gas in a gas compressor, before sending the compressed gas to the carbonation reactor.

BRIEF DESCRIPTION OF THE DRAWING

FIG. 1 is a graphical depiction of the reaction rate in grams of calcium hydroxide (expressed as calcium carbonate) per liter of slurry per minute, showing the increase in carbonation reaction rate as the pressure at which the carbonation reaction takes place is increased.

FIG. 2 is graphical depiction of the increase in carbonation efficiency as the pressure at which the carbonation reaction takes place is increased.

FIG. 3 is a graphical depiction of the change in surface area of precipitated calcium carbonate, showing the change as the pressure at which the carbonation reaction takes place is increased.

FIG. 4 is a graphical depiction of the change in density of a paper sheet made by utilizing the PCC produced by my novel method as a filler, with the sheet density shown as a function of the pressure at which the carbonation reaction takes place.

FIG. 5 is a graphical depiction of the change in porosity of a paper sheet made by utilizing the PCC produced by my novel method as a filler, with the sheet porosity shown as a function of the pressure at which the carbonation reaction takes place.

FIG. 6 is a graphical depiction of the change in brightness of a paper sheet made by utilizing the PCC produced by my novel method as a filler, with the sheet brightness shown as a function of the pressure at which the carbonation reaction takes place.

FIG. 7 is a graphical depiction of the change in opacity of a paper sheet made by utilizing the PCC produced by my novel method as a filler, with the sheet opacity shown as a function of the pressure at which the carbonation reaction takes place.

FIG. 8 is a graphical representation of the light scattering coefficient of the precipitated calcium carbonate produced by the present process as a function of the pressure at which the carbonation reaction takes place.

FIG. 9 is a graphical comparison of the reaction rate of the carbonation reaction as a function of the temperature at which the carbonation reaction takes place, showing the reaction rate for a gas stream containing 20 percent carbon dioxide, at 0 psig (atmospheric pressure) and at 30 psig.

FIG. 10 is a graphical comparison of the carbon dioxide usage efficiency as function of the temperature at which the carbonation reaction is carried out, showing the efficiency for a gas stream containing 20 percent carbon dioxide, at 0 psig (atmospheric pressure), and at 30 psig.

FIG. 11 is a graphical representation of the surface area (shown as Blaine) of PCC as a function of the temperature at which the carbonation reaction is carried out, showing the PCC surface area for a gas stream containing 20 percent carbon dioxide at 0 psig (atmospheric pressure), and when using my novel process at 30 psig.

FIG. 12 is a graphical depiction of the change in density of a paper sheet made by utilizing the PCC produced by my novel method as a filler, with the sheet density shown as a function of the temperature at which the carbonation reaction takes place.

FIG. 13 is a graphical depiction of the change in porosity of a paper sheet made by utilizing the PCC produced by my novel method as a filler, with the sheet porosity shown as a function of the temperature at which the carbonation reaction takes place.

FIG. 14 is a graphical depiction of the change in brightness of a paper sheet made by utilizing the PCC produced by my novel method as a filler, with the sheet brightness shown as a function of the temperature at which the carbonation reaction takes place.

FIG. 15 is a graphical depiction of the change in opacity of a paper sheet made by utilizing the PCC produced by my novel method as a filler, with the sheet opacity shown as a function of the temperature at which the carbonation reaction takes place.

FIG. 16 is a graphical representation of the light scattering coefficient of the precipitated calcium carbonate produced by the present process as a function of the temperature at which the carbonation reaction takes place.

FIG. 17 is a graphical representation of the reaction rate of the carbonation reaction as a function of the percentage of carbon dioxide a gas stream provided to the carbonation reactor, showing the efficiency for a gas stream at 0 psig (atmospheric pressure), and clearly showing the increased reaction rate when using my novel process at 30 psig.

FIG. 18 is a graphical representation of the carbonation reaction efficiency as a function of the percentage of carbon dioxide in a gas stream provided to the carbonation reactor, showing the efficiency for a gas stream at 0 psig (atmospheric pressure), and clearly showing the increased efficiency when using my novel process at 30 psig.

FIG. 19 is a graphical representation of the surface area of precipitated calcium carbonate (as indicated by Blaine) a function of the percentage of carbon dioxide in a gas stream provided to the carbonation reactor, showing the efficiency for a gas stream at 0 psig (atmospheric pressure), and showing the increased surface area when using my novel process at 30 psig, for low (5% by volume) to moderate (20% by volume) carbon dioxide concentrations.

FIG. 20 is a graphical depiction of the change in density of a paper sheet made with precipitated calcium carbonate, with the sheet density shown as a function of the concentration of carbon dioxide in the carbonation reactor incoming gas stream, for 0 psig (atmospheric pressure), and showing the density when using my novel process at 30 psig.

FIG. 21 is a graphical depiction of the change in porosity of a paper sheet made by utilizing precipitated calcium carbonate, with the sheet porosity shown as a function of the concentration of carbon dioxide in the carbonation reactor incoming gas stream, for 0 psig (atmospheric pressure), and showing the porosity when using my novel process at 30 psig.

FIG. 22 is a graphical depiction of the change in brightness of a paper sheet made by utilizing PCC as a filler, with the sheet brightness shown as a function of the concentration of carbon dioxide in the carbonation reactor incoming gas stream, for 0 psig (atmospheric pressure), and showing the brightness when using my novel process at 30 psig for the production of PCC.

FIG. 23 is a graphical depiction of the change in opacity of a paper sheet made utilizing PCC as a filler, with the sheet opacity shown as a function concentration of carbon dioxide in the carbonation reactor incoming gas stream, for 0 psig (atmospheric pressure), and showing the opacity when using my novel process at 30 psig for the production of PCC.

FIG. 24 is a graphical representation of the light scattering coefficient of PCC as a function concentration of carbon dioxide in the carbonation reactor incoming gas stream, for 0 psig (atmospheric pressure), and showing the light scattering coefficient when using my novel process at 30 psig for the production of PCC.

FIG. 25 is a graphical representation of the reaction rate of the carbonation reaction, in terms of the grams per liter per minute of calcium hydroxide converted, as a function of the concentration of calcium hydroxide in the lime slurry (expressed as grams of calcium hydroxide as calcium carbonate, per liter of slurry), for a reaction according to my invention, carried out at 30 psig and 100° F. using a gas stream to the carbonation reaction which contains 20% carbon dioxide by volume.

FIG. 26 is a graphical representation of the carbon dioxide efficiency, in the carbonation reaction as a function of the concentration of calcium hydroxide in the lime slurry (expressed as grams of calcium hydroxide as calcium carbonate, per liter of slurry), for a reaction according to my invention, carried out at 30 psig and 100° F. using a gas stream which contains 20% carbon dioxide by volume upon entry to the carbonation reactor.

FIG. 27 is a graphical representation of the surface area (Blaine) of PCC produced by my process as a function of the concentration of calcium hydroxide in the lime slurry (expressed as grams of calcium hydroxide as calcium carbonate, per liter of slurry), for a reaction according to my invention carried out at 30 psig and 100° F. using a gas stream to the carbonation reaction which contains 20% carbon dioxide by volume.

FIG. 28 is a graphical representation of the reaction rate of the carbonation reaction as a function of the speed of the agitator used to stir the lime slurry in the reactor, for a reaction carried out at 30 psig and 100° F. using a gas stream entering the carbonation reactor which contains 20% carbon dioxide by volume.

FIG. 29 is a graphical representation of the carbon dioxide utilization efficiency as a function of the speed of the agitator used to stir the lime slurry in the reactor, for a reaction carried out at 30 psig and 100° F. using a gas stream entering the carbonation reactor which contains 20 percent carbon dioxide by volume.

FIG. 30 is a graphical representation of the surface area (Blaine) of the PCC made in my novel process, expressed as a function of the speed of the agitator used to stir the lime slurry in the reactor, for a reaction carried out at 30 psig and 100° F. using a gas stream entering the carbonation reactor which contains 20% carbon dioxide by volume.

FIG. 31 is a photograph of the sclenohedral crystals of precipitated calcium carbonate obtained in the process of the present invention; the photographs were taken with a scanning electromicroscope (SEM).

FIG. 32 is a photograph of the rhombohedral crystals of precipitated calcium carbonate obtained in the process of the present invention, where the crystals have an aspect ratio of approximately 1:1; the photographs were taken with a scanning electromicroscope (SEM).

FIG. 33 is a photograph of the rhombohedral crystals of precipitated calcium carbonate obtained in the process of the present invention, where the crystals have an aspect ration of approximately 1:1.5; the photographs were taken with a scanning electromicroscope (SEM).

FIG. 34 is a photograph of the stacked rhombohedral crystals of precipitated calcium carbonate obtained in the process of the present invention; the photographs were taken with a scanning electromicroscope (SEM).

FIG. 35 is a photograph of the aragonite crystals of precipitated calcium carbonate obtained in the process of the present invention; the photographs were taken with a scanning electromicroscope (SEM).

FIG. 36 is a process flow diagram showing one convenient arrangement for lime slaking, to prepare a calcium hydroxide slurry for feed to a pressurized carbonation reactor, in order to carry out the process of the present invention.

FIG. 37 is a process flow diagram showing one convenient configuration for gas compression, or alternate carbon dioxide preparation, for feed of pressurized carbon dioxide to a pressurized reactor, in order to carry out the process of the present invention.

FIG. 38 is a process flow diagram showing one convenient arrangement for reaction of lime slurry with carbon dioxide under pressurized conditions, and for final preparation of the product produced in the carbonation reactor.

In general, the information depicted in the various figures represents data developed from schlenohedral precipitated calcium carbonate crystals, unless otherwise indicated.

DESCRIPTION

A novel process for producing precipitated calcium carbonate is provided which enables the efficient use of "free" carbon dioxide found in flue gas, and more particularly, from flue gas containing relatively low concentrations of carbon dioxide. This process is capable of providing a variety of PCC morphologies, and the use of such PCC produced by this process has some unique properties for use as a filler in papermaking operations. This in turn results in some unusual and beneficial paper properties for the superior paper products made with the PCC provided according to the inventive process disclosed herein. Importantly, the precipitated carbonates that can be manufactured by this process include distinct crystal morphologies including calcite scalenohedral, calcite rhombohedral of various aspect ratios, and aragonite.

The basic chemistry for producing precipitated calcium carbonates is well known, and the basic steps of calcination, slaking, and carbonation, were noted above. The following chemical reactions describe such basic steps:

$$CaCO_3 \xrightarrow{\Delta H} CaO + CO_2 \uparrow \quad (1)$$

$$CaO + H_2O \longrightarrow Ca(OH)_2 + \Delta H \quad \sim pH\ 12.4 \quad (2)$$

$$Ca(OH)_2 + CO_2 \rightleftharpoons CaCO_3 + H_2O + \Delta H \quad \sim pH\ 9.4 \quad (3)$$

The final carbonation reaction is an equilibrium reaction. Therefore, as the soluble calcium ion is converted to calcium carbonate precipitate, more dissolution of the calcium hydroxide takes place from the lime slurry to increase the concentration of the calcium ion up to the solvent solubility limits (inverse temperature dependent phenomenon), until all of the available calcium hydroxide is dissolved, and all available calcium ions have been converted into calcium carbonate.

The carbonation reaction is accompanied by the evolution of heat (i.e, it is an exothermic reaction). The pH of the lime slurry decreases during the course of the reaction of a batch of lime with carbon dioxide, and such pH changes from approximately 12.4 to the equilibrium pH of 8, plus or minus about 1 pH unit. However in my process the endpoint of the carbonation reaction is indicated when the pH reaches 7, +/−0.5 pH units. The reaction rate of the carbonation step is effected by (a) the concentration of soluble calcium ion, which is controlled by the rate of dissolution of calcium hydroxide, and (b) rate of carbon dioxide dissolution or mass transfer into water to form an available carbonate ion.

It is important to note, for purposes of my invention, that the rate of dissolution of $Ca(OH)_2$ is a function of the temperature and of the pressure at which the dissolution takes place. This is important since the controlling reaction in the overall calcium carbonate production process is the dissolution of the available calcium hydroxide, which is only sparingly soluble in aqueous solution, and which is inversely dependent upon temperature in aqueous solution.

The conventional industrial process for production of precipitated calcium carbonate is performed by providing a slurry of approximately 200 g/L of calcium hydroxide in an atmospheric reactor, and bubbling a gas stream containing carbon dioxide at about 15–20% by volume into the reactor. In commercially employed PCC production processes, reaction rates in the range of from about 0.5 grams per liter of slurry per minute to about 1.5 grams per liter of slurry per minute are commonly seen. Thus, in prior art PCC production processes, the time required to complete the reaction in the carbonation reactor is approximately 200 minutes. That relatively slow overall reaction rate results in a requirement for large carbonation reactors (reactors in the 18,000 to 20,000 gallon range are common), with the associated high capital costs. The following ionic reactions describe the overall PCC production process:

$$Ca(OH)_2\ slurry \longrightarrow Ca(OH)_2\ (aq) \quad (SLOW) \quad (4)$$

$$Ca(OH)_2\ (aq) \longrightarrow Ca^{+\!+} + 2\ OH^-\ (aq) \quad (FAST) \quad (5)$$

$$Ca(OH)_2\ slurry \longrightarrow Ca^{+\!+} + 2OH^- \quad (SLOW) \quad K_{eq} = 6.46 \times 10^{-6} \quad (6)$$

$$CO_2(g) + H_2O \longrightarrow H_2CO_3 \quad (FAST) \quad K_{eq} = 0.035 \quad (7)$$

$$H_2CO_3(aq) + OH^- \longrightarrow H_2O + HCO_3^-\ (aq) \quad (SLOW) \quad K_{eq} = 4.5 \times 10^{-7} \quad (8)$$

$$HCO_3^-(aq) + OH^- \longrightarrow H_2O + CO_3^=\ (aq) \quad (SLOW) \quad K_{eq} = 4.7 \times 10^{-11} \quad (9)$$

$$CO_2(g) + H_2O \longrightarrow 2H^+ + CO_3^= \quad (FAST) \quad (10)$$

Calcium carbonate is produced by the combination of equations (6) and (10):

$$Ca^{+\!+}(aq) + CO_3^=(aq) \longrightarrow CaCO_3(s) \quad (FAST) \quad K_{eq} = 2.2 \times 10^8 \quad (11)$$

The reactions described by equations (4), (6), (8), and (9) are slow reactions. Thus the rate controlling reactions could be considered to be reactions (4) and (9). On the other hand, the reactions described by the equations (7) and (10) are instantaneous. In any event, the overall reaction for formation of PCC, based on raw materials supplied to the process, is as follows:

$$Ca(OH)_2 + CO_2 \longrightarrow CaCO_3 + H_2O \quad (12)$$

Also, the calcium carbonate formed by equations (11 or 12) is also partially soluble in the presence of weak carbonic acid as follows:

$$CaCO_3 + CO_2 + H_2O \rightleftharpoons Ca(HCO_3)_2 \quad (13)$$

For purposes of my invention, it is important to understand that the equilibrium of the overall reaction (12) is controlled by the following primary process variables:

1) Reaction Temperature
2) Concentration of carbon dioxide
3) Partial pressure of carbon dioxide
4) Rate of flow of carbon dioxide
5) Concentration of $Ca(OH)_2$
6) Solubility of $Ca(OH)_2$
7) Rate of agitation
8) Crystalline habit of the calcium carbonate (calcite vs. aragonite)
9) Chemical additives Importantly, carrying out the carbonation reaction at a pressure greater than atmospheric increases the solubility of carbon dioxide in aqueous solution, which thus provides a higher concentration of carbonate ions in solution, for reaction with available calcium ions. Also, the elevated pressure is believed to increase the $Ca^{++}$ formation. Consequently, an overall increase in the rate of the carbonation reaction is experienced, thus leading to an increase in carbonation efficiency, as well as in the production of finer PCC particles.

Turning now to FIGS. 36, 37, and 38, process flow schemes for my novel PCC production process are illustrated. Calcium oxide (lime) 54 is normally delivered from a rail car (not shown) via hopper or conveyor or other transport device such as pneumatic tube powered by blower to an incoming lime storage silo 56. A feeder sends stored lime via conveyor to a slaker tank 62 which is stirred by high sheer mixing agitator 64. Slaking water is added to slaker tank 62 via line 66 from mill water storage tank 68. Storage tank 68 can be fed with water and steam to provide a desired water temperature in storage tank 68. Slaked lime is pumped via pump 69 to screen 70 to remove oversize materials. Grit 72 is captured and sent via screw conveyor 74 to grit bin 75.

The stirred slaked lime slurry is dropped into a mixer 80 stirred surge tank 84 and then pumped 86 via heat exchanger 88 to a storage tank 90 which is stirred by agitator 92. Preferably, the volume of slurry stored in storage tank 90 matches the charge required by carbonation reactor 100 (see FIG. 38), so that once a batch of slurry is sent from tank 90 to carbonation reactor 100, the storage tank 90 can be refilled with another batch of slurry. By matching the size (in terms of throughput) of the slaker 62 to the size (in terms of thruput) of the carbonation reactor 100, equipment can be optimized, and both the slaker 62 and the carbonation reactor 100 can be almost continuously utilized. When desired to produce the proper crystal habit product, the lime slurry discharged from tank 90 via pump 101 can be cooled via chiller 102, or other convenient heat exchange apparatus or process in order to increase the solubility of calcium in aqueous liquid in the carbonation reactor 100.

Any convenient source of carbon dioxide can be utilized in my novel process, ranging from fresh carbon dioxide provided from storage tanks 103, or more commonly, flue gas 104 which is sent to quencher 106 for cooling by a cooling water stream 108. The quenched gases flow via line 110 to compressor 112 which increases the pressure of the gas stream, thus increasing the partial pressure of carbon dioxide supplied to the carbonation reactor 100. The compressed gas stream 114 is sent to a heat exchanger 116 for cooling of the gas stream via water stream 118 which is returned to sewer 120. Alternately, carbon dioxide from tank 103 is heated via steam supply 122 to heat exchanger 124. The conditioned carbon dioxide stream, i.e., at a pre-selected temperature and pressure suitable to assist in producing the desired crystal habit PCC product, is sent via line 130 to the reactor 100. The cooled, compressed gas stream 130 containing carbon dioxide under pressure is sent to the carbonation reactor 100.

The lime slurry at a preselected temperature is sent from storage tank 90 to carbonation reactor 100 via line 132. During the reaction of a batch of slurry in reactor 100, the pH of the liquid in the carbonation reactor 100 is measured by pH probe 134 or by other suitable method or means, until the pH falls and ultimately reaches a desired endpoint that indicates that available calcium has been consumed. During reaction, agitator 136 maintains high shear agitation in reactor 100. Agitator 136 therefore has a high tip speed, ranging from about 260 feet per minute up to about 780 feet per minute, depending upon the design configuration.

The present invention involves carrying out the carbonation reaction between $CO_2$ and $Ca(OH)_2$ under pressure in a carbonation reactor 100 which is a pressure vessel. This novel process involves bubbling $CO_2$ into the $Ca(OH)_2$ slurry in reactor 100 where the pressure can range from above atmospheric pressure to as much as about 100 psig. Preferably, the pressure in the reactor 100 is maintained at up to about 30 psig, and more preferably, the pressure in the reactor is maintained in the range from about 15 psig to about 30 psig. Inert gas and any residual carbon dioxide not utilized (such loss is kept to an absolute minimum) in reactor 100 is routed via vent line 138 to the atmosphere.

By carrying out the carbonation reaction under pressure according to this invention, the reaction rate can be increased from the rate of about 1.0 grams of calcium hydroxide per liter of slurry per minute to up to 10 grams of calcium hydroxide per liter of slurry per minute. Thus, a production rate increase of as much as 10 fold can be achieved by utilizing my novel process. This dramatic increase in reaction rate, even when employed at moderate pressures or with lower concentrations of carbon dioxide, results in a decrease in carbonation time from the prior art range of 180 to 200 minutes per batch (when conducted at atmospheric pressure conditions) to as low as 30 to 40 minutes per batch (when conducted under pressurized conditions in carbonation reactor 100). Importantly, the carbonation reactor can be sized less than 200 gallons capacity per ton per day of PCC output, and more preferably, less than 100 gallons capacity per ton per day, and most preferably, less than 50 gallons per ton per day of PCC output.

Importantly, in my novel process, key process parameters, such as reaction temperature, carbon dioxide partial pressure, flow rate of carbon dioxide, lime slurry concentration in the carbonation reactor, agitator speed in the carbonation reactor, can be more effectively employed, in order to (a) increase the rate of carbonation reaction, (b) increase the carbonation efficiency, i.e., carbon dioxide utilization, and (c) to produce $CaCO_3$ particles of different morphology, shape, size, and size distribution.

In any event, the precipitated calcium carbonate produced in carbonation reactor 100 is discharged, preferably a PCC batch tank 182 which is stirred by agitator 184. Each PCC batch is then discharged via pump 186 to final screens 188, where any remaining oversize material is removed and sent via chute 190 to conveyor 72 and ultimately to grit bin 74. The produced PCC is received in tank 200. Optionally, line 154 supplies additional selected chemicals from tank 202 to via metering pump 203 to tank 200, to minimize any pH rise and associated loss of product, as well as to provide further product quality attributes as may be desired in a particular on-site situation. Tank 200 is preferably, but need not be, atmospheric. Finally, the product PCC is stored in tank 205, and mixed with agitator 204, before being sent via pump 206 to the papermill.

The pressure carbonation drives the overall reaction, by improving the $CO_2$ mass transfer ($CO_3^=$ formation). The higher reaction pressure evidently also increases the solubilization of $Ca(OH)_2$ slurry into calcium ions ($Ca^{++}$). This results in a higher reaction rate, due to increased calcium ion availability, which in turn reduces the reaction time of calcium carbonate formation.

Since much higher reaction rates are achievable, for the same production rate, my novel PCC manufacturing can be carried out using much smaller equipment and building size than is the case with prior art atmospheric PCC production equipment. Overall, even considering the additional equipment required in my process, such as the gas compressor, an overall lower capital and operating cost is achievable.

Another distinct advantage of this "Pressure Carbonation" invention is that it increases the efficiency of $CO_2$ utilization. Moreover, of industrial significance is the ability to use carbon dioxide in concentrations as low as 5 percent by volume. Because the incoming gas stream is pressurized, and the partial pressure of carbon dioxide is increased in the aqueous solution, the pressurized carbonation reaction provides higher concentrations of $CO_3$ ions, since the dissolution of $CO_2$ is proportional to the partial pressure of $CO_2$. Importantly, low grade carbon dioxide containing gases (including those in the 10.0% carbon dioxide by volume range) such as are available from gas fired boilers, can be advantageously employed in on-site PCC production plants.

Even when utilizing low concentrations of $CO_2$, utilization of the same may exceed 90%, and more preferably, exceed 95%, and most preferably, exceed 99%.

My novel pressure carbonation process for the production of PCC can also produce a wide variety of crystal habits, including like calcite, rhombohedral, and aragonite in different sizes, shapes, and aspect ratios.

Finally, and most importantly, the PCC provided by the instant invention produces crystals which improve key paper properties, including porosity, density, brightness, and opacity.

My novel process has been thoroughly investigated in experimental laboratory apparatus, in three main steps:

(1) Slaking

Market quality lime in a quantity from about 50 to about 300 grams (90% CaO), size at ½" rotary pebble type lime, was added slowly to approximately 1.2 liters of water, under constant stirring. The time taken for slaking was approximately 30 minutes. Due to the exothermic nature of the reaction, the final temperature is elevated over starting conditions. The actual final temperature rise is dependent on the initial water temperature and on the "reactivity" of the lime. In general, the initial temperature of water provided in the process is in the range of 80° F. to about 100° F. The final temperature, after slaking, is normally in the range from about 150° F. to about 160° F. In any event, the resulting calcium hydroxide slurry is screened, preferably through a 140 mesh screen.

2) Pressure Carbonation—Lab Reactor Design

Experimentally, the screened $Ca(OH)_2$ slurry is then transferred into a reaction vessel of 1.6L total capacity. The reactor is capable of being heating with outside jacketed heaters. The system can be sealed and operated at super atmospheric pressures (i.e. at pressures greater than atmosphere). The reactor is also fitted with a cooling coil to maintain isothermal temperature, when desired necessary. In the experimental vessel, the agitator impeller used is a Rustin 200. The agitator/impeller is connected to a magnetic, variable speed, drive. The particular vessel is also fitted with a dip or a sample tube. The primary purpose of the dip tube is to obtain samples of $Ca(OH)_2/CaCO_3$ slurry periodically and to follow the conversion of calcium hydroxide to calcium carbonate by measuring pH and/or by titration. The experimental reactor is also connected to a temperature controller via a transducer (3) Pressure Carbonation—Process and Process Variables Experimentally, the slaked lime slurry was placed in a reactor capable of withstanding pressures greater than 1 atmosphere. The carbon dioxide was supplied from pressure cylinders with a pressure in the range of 0 to about 180 psig. In order to simulate flue gas from lime kilns, the primary source of $CO_2$ containing gasses for commercial onsite PCC plants, nitrogen ($N_2$) from pressure cylinders was also supplied along with the $CO_2$. Each of the gases are passed through a separate mass flow meter. The flow of gases was further verified by a CO2/water displacement process and/or by actually weighing the mass of $CO_2$ lost from the $CO_2$ cylinder. The reaction conditions were varied to meet the specific requirement of reaction rate, particle size, shape and morphologies. The $Ca(OH)_2$ concentration used ranged from 50 grams per liter of slurry (90% CaO) to a high of about 300 grams per liter of slurry. The preferred concentration was about 250 grams of calcium hydroxide per liter of slurry. Experimentally, the carbonation temperature was varied from 60° F. to 130° F. In generally, the selected temperature was chosen based on the need to obtain a desired crystal morphology and particle size. For example, sclenohedral PCC was manufactured in the range of 90° F. to 106° F. carbonation temperature. The preferred carbonation temperature for rhombohedral PCC was 30° F. to 50° F. Finally, the threshold carbonation temperature for an aragonite structure was approximately 120° F.

The carbon dioxide concentration was also varied from a low of 5.0% $CO_2$/95% $N_2$ by volume to a high of 100% $CO_2$/0% $N_2$ by volume. The preferred $CO_2$ concentration fraction was 20% $CO_2$, with the remainder 80% $N_2$, by volume.

Another important variable is the flow rate of the carbon dioxide through the carbonation reactor. Experimentally, the flow of carbon dioxide was varied from a conventional flow rate of 0.5 L/min to 4.0 L/min. The preferred flow rate was 1.5 liters per minute for the above noted size reactor.

The rate of agitation of the impeller speed is important, in order to maintain high rates of mass transfer of $CO_2$ (gas) into dissolved $CO_2$ (aqueous), i.e, the rate of carbonic acid formation. Experimentally, the agitator speed was varied from 500 rpm to 1500 rpm. The preferred rpm was 1470.

Importantly, operating the carbonation reaction under isothermal conditions resulted in unique PCC products.

Experimentally, since the carbonation reaction is an exothermic reaction, the progress of the reaction was accompanied by an observed increase in temperature. The reaction kinetics were determined using temperature to indicate the endpoint of the carbonation reaction. As the conversion of $Ca(OH)_2$ into $CaCO_3$ was completed, the temperature reached a maximum, and then dropped. A temperature probe controller connected to the reaction vessel was used to follow the rise and fall of the reaction temperature. The temperature profile was used to indicate the reaction end point. The chemical analysis of the final product, and pH, confirmed the finding of the carbonation reaction end point. If the pH drifts higher, then the carbon dioxide can be applied sequentially until stable pH is achieved.

Experimentally, the calcium carbonate formed under the novel pressure carbonation technique was filtered through a Whatman #212 filter paper using a vacuum pump, and was washed to remove impurities. One portion of the sample was dried, and the other portion was reslurried for end use in performance testing via preparation of paper handsheets.

Specific examples which set forth novel process parameters, or products, include the following examples:

EXAMPLE 1
The Effect of Pressure in a Pressure Carbonation System on Reaction Rate, Carbonation Efficiency, and Surface Area In a series of experiments, the carbonation reaction pressure was raised from 0 psig (as done with a conventional open tank PCC system) to 70 psig. The reaction temperature was kept constant at 100° F. and the % $CO_2$ was kept constant at 20% $CO_2$/80% $N_2$ by volume. The resulting experimental data is given in Table 1B. The resulting reaction rate at 0 psig was 4.6 grams per liter of slurry per minute. In the pressure carbonation system operating at 70 psig, it was 6.1 grams per liter per minute. The increase in reaction rate was approximately 33%. The carbonation efficiency, i.e., carbon dioxide utilization, increased from 76% to 100%. The surface area (Blaine) of the PCC produced by the process increased from 31,400 $cm^2$/gram at 0 psig, to a maximum of 40,200 $cm^2$/g at 50 psig, and then decreased slightly to 35,500 $cm^2$/g at 70 psig. See FIGS. 1, 2, and 3.

TABLE 1A

Effect of Pressure on Reaction Rate, Carbonation Efficiency, and Surface Area

| Batch # | Pressure (psig) | Reaction Rate | Carbonation Efficiency (%) | Surface Area ($cm^2$/g) |
|---|---|---|---|---|
| 135 | 0 | 4.6 | 77.379 | 31,400 |
| 136 | 10 | 5.2 | 86.308 | 33,200 |
| 146 | 20 | 5.6 | 88.000 | 38,700 |
| 137 | 30 | 5.6 | 93.500 | 37,200 |
| 143 | 30 | 5.6 | 95.489 | 36,800 |
| 138 | 50 | 6.0 | 97.565 | 40,200 |
| 148 | 60 | 5.9 | 102.000 | 36,300 |
| 139 | 70 | 6.1 | 97.565 | 35,500 |

Effect of Carbonation Reaction Temperature on Key Paper Properties

The PCC batches prepared in Example 1 were then used to prepare paper handsheets. Some of the key paper properties, including sheet density, sheet porosity, sheet brightness, and sheet opacity, were then measured in each of the handsheets which were formed. The data from tests on handsheets is provided in Table 1B below. A graphical representation of the data is also provided in FIGS. 4 through 9 below. It is important to note some of the key characteristics of paper made from PCC under different carbonation pressures. The sheet density of paper handsheets containing PCC produced under increasing pressure is shown in FIG. 4. The sheet porosity of paper handsheets containing PCC produced under increasing pressure is shown in FIG. 5. As shown in FIG. 6, the sheet brightness of paper handsheets containing PCC produced under pressure decreased as pressures increased up to about 30 psig. Thereafter, the sheet brightness increases as the reaction pressure was increased from 30 psig to 70 psig. As shown in FIG. 7, the sheet opacity of paper handsheets increased as the pressure of the carbonation reaction producing the PCC increased. Also, as indicated in FIG. 8, the scattering coefficient of handsheets produced using PCC manufactured under pressure carbonation proved higher than the scattering coefficient of PCC produced at 0 psig as in a conventional, open system.

TABLE 1B

Effect of Carbonation Reaction Pressure on Key Paper Properties

| Batch # | Pressure (psig) | Density (g/cm³) | Porosity (sec/100 cc air) | Brightness (ISO) | Opacity (ISO) | Scattering Coefficient ($cm^2$/g) |
|---|---|---|---|---|---|---|
| 135 | 0 | 0.588 | 11.37 | 90.71 | 87.83 | 2338.55 |
| 136 | 10 | 0.595 | 12.09 | 90.58 | 88.11 | 2358.83 |
| 137 | 30 | 0.595 | 13.11 | 90.48 | 88.35 | 2442.24 |
| 138 | 50 | 0.610 | 14.66 | 90.57 | 88.00 | 2321.92 |
| 139 | 70 | 0.606 | 14.65 | 90.72 | 88.33 | 2340.92 |

EXAMPLE 2
The Effect of Temperature in a "Pressure Carbonation" System

As in example 1, the slaked lime was placed into a reactor at a slurry concentration of 250 grams of calcium hydroxide grams per liter. The starting carbonation temperature was varied from 65° F. to 125° F. A first set of reactions was carried out under conventional atmospheric pressure or open PCC type system conditions at 0 psig. The next set of reactions was carried out under a pressure of 30 psig. A gas mixture of 20% carbon dioxide and 80% nitrogen by volume was bubbled through the reactor. The flow of carbon dioxide was at the rate of 1.5 liters per minute. The reaction rate was calculated by titrating $Ca(OH)_2$ at the beginning and end of the reaction. As the reaction proceeded, the reaction temperature increased, with the temperature starting at 38° C. and ending at 73° C. The end of the reaction was indicated when the temperature reached a maximum and then declined. The point of inflection in the temperature curve was taken as the completion point of the carbonation reaction.

The carbonation reaction conditions and the experimental data resulting is shown in Table 2A and in Table 2B. The reaction rates at varying temperature, for a prior art atmospheric system (0 psig) are shown in FIG. 9. The corresponding reaction rates for my "pressurized carbonation" system operating at 30 psig are also shown in FIG. 9. The graphs indicate that in the pressurized carbonation process, the reaction rates steadily increased as a function of temperature. On the other hand, the data indicated that the reaction rate as a function of temperature in an open system (at 0 psig) gradually as temperature was raised, from approximately 4.4 grams per liter per minute to 5.0 grams per liter per minute until the temperature reached about 100° F. However, FIG. 9 shows that as the temperature was increased beyond 100° F., the rate of reaction decreased to 4.4 grams per liter per minute.

As indicated in FIG. 10, similar results were observed with respect to carbon dioxide utilization efficiency. The carbon dioxide utilization efficiency in my pressurized system increased significantly as the temperature was increased from about 60° F. to about 120° F. As can be seen in FIG. 10, with carbonation occurring at 30 psig, the carbon dioxide utilization efficiencies were in the range from slightly above 80% to about 100%. In an atmospheric system (operating at 0 psig) the carbonation efficiency was lower, ranging from about 74% to about 84%.

Overall, a pressurized carbonation system provided a higher reaction rate throughout the whole range of operating temperature. The surface areas of the produced PCC, as measured by Blaine for both the pressurized and non-pressurized systems at different temperatures, is provided in FIG. 11. In both the pressurized system and in the atmospheric system cases, the surface area of the product decreased as the reaction temperature was increased. The surface area of calcium carbonate decreased from approximately 44,000 $cm^2/g$ to a coarse PCC of 22,000 $cm^2/g$. Importantly, the controllability of surface area via temperature was more linear under pressurized carbonation conditions, at least at the 30 psig condition which was tested.

TABLE 2A

The Effect of Temperature on Reaction Rate, Carbonation Efficiency, and Surface Area in a Non-Pressurized System.

| Batch # | Temperature (° F.) | Pressure (psig) | % $CO_2$ | Reaction Rate (g/L/m) | Carbonation Efficiency (%) | Surface Area ($cm^2/g$) |
|---|---|---|---|---|---|---|
| 175 | 70 | 0 | 20.0 | 4.40 | 77.4 | 42,100 |
| 174 | 80 | 0 | 20.0 | 4.20 | 74.8 | 44,700 |
| 173 | 90 | 0 | 20.0 | 4.75 | 81.6 | 42,800 |
| 172 | 100 | 0 | 20.0 | 4.96 | 81.6 | 33,800 |
| 169 | 106 | 0 | 20.0 | 4.70 | 84.7 | 34,500 |
| 170 | 110 | 0 | 20.0 | 4.60 | 80.14 | 23,900 |
| 171 | 120 | 0 | 20.0 | 4.40 | 76.1 | 23,000 |

TABLE 2B

The Effect of Temperature on Reaction Rate, Carbonation Efficiency, and Surface Area in a Pressurized System

| Batch # | Temperature (° F.) | Pressure (psig) | % $CO_2$ | Reaction Rate (g/L/m) | Carbonation Efficiency (%) | Surface Area ($cm^2/g$) |
|---|---|---|---|---|---|---|
| 127 | 65 | 30.0 | 20 | 4.82 | 81.6 | 52,700 |
| 129 | 70 | 30.0 | 20 | 5.30 | 91.6 | 42,000 |
| 130 | 80 | 30.0 | 20 | 5.16 | 88.0 | 41,500 |
| 128 | 90 | 30.0 | 20 | 5.40 | 91.6 | 43,100 |
| 133 | 100 | 30.0 | 20 | 5.30 | 93.5 | 36,100 |
| 131 | 106 | 30.0 | 20 | 5.72 | 95.5 | 27,800 |
| 132 | 110 | 30.0 | 20 | 5.93 | 99.7 | 24,100 |
| 134 | 120 | 30.0 | 20 | 6.10 | 100.0 | 22,100 |

TABLE 2C

Effect of Carbonation Reaction Temperature on Key Paper Properties

| Batch # | Temperature (° F.) | Density (g/$cm^3$) | Porosity (sec/ 100 cc air) | Brightness (ISO) | Opacity (ISO) | Scattering Coefficient ($cm^2/g$) |
|---|---|---|---|---|---|---|
| 127 | 65 | 0.610 | 17.18 | 88.93 | 84.97 | 1539.58 |
| 129 | 70 | 0.606 | 14.38 | 89.81 | 85.96 | 1778.02 |
| 130 | 80 | 0.606 | 14.25 | 90.27 | 86.82 | 2035.03 |
| 128 | 90 | 0.613 | 16.96 | 90.33 | 86.95 | 2074.19 |
| 133 | 100 | 0.606 | 12.66 | 90.73 | 88.33 | 2340.79 |
| 131 | 106 | 0.588 | 9.31 | 90.45 | 87.44 | 2246.31 |
| 132 | 110 | 0.581 | 8.38 | 89.77 | 86.61 | 2021.03 |
| 134 | 120 | 0.592 | 9.41 | 90.03 | 85.67 | 1799.77 |

EXAMPLE 3

The effect of % $CO_2$ Concentration on Reaction Rate, Carbonation Efficiency, and Surface Area In this series of experiments, the concentration of $CO_2$ was varied from 5.0% $CO_c$/95% N, to 100% $CO_2$/0% $N_2$, by volume. Other reaction conditions were kept constant at the following levels:

Flow of $CO_2$: 1.5 liters per minute
Carbonation Reaction Temp.: 100° F.
$Ca(OH)_2$ Concentration: ~260 grams per liter The results of the measurements of the reaction rate, carbonation efficiency, and PCC surface area are given in Table 3A and 3B. The results are also graphed in FIGS. 17, 18, and 19.

It is evident from FIG. 17 that when the entering gas stream contains only 5% $CO_2$, the reaction rate is almost doubled by using my "pressure carbonation" PCC production process with pressure carbonation at 30 psig. As indicated in FIG. 19, the surface area comparison between batch #140 and batch #149 also indicates the formation of a finer PCC particle size using the "pressure carbonation" technique.

Also, as the concentration of carbon dioxide increased, the reaction rates increased. Similarly, the carbonation efficiency increased with increasing $CO_2$ concentration. The particle surface area also increased with $CO_2$ concentration indicating formation of finer PCC particles (42,000 $cm^2/g$). The reaction rate under the pressurized system was much higher than with the reaction carried out at atmospheric pressure. See FIGS. 17, 18, and 19.

TABLE 3A

The Effect of $CO_2$ Concentration on Reaction Rate, Carbonation Efficiency, and Surface Area in a Pressurized System.

| Batch # | Pressure | % $CO_2$ | Reaction Rate | Carbonation Efficiency (%) | Blaine ($cm^2/g$) |
|---|---|---|---|---|---|
| 140 | 30 | 5 | 4.5 | 76.0 | 25,700 |
| 141 | 30 | 10 | 5.3 | 89.0 | 35,700 |
| 142 | 30 | 15 | 5.7 | 93.5 | 29,200 |
| 143 | 30 | 20 | 5.6 | 95.5 | 36,800 |
| 144 | 30 | 50 | 6.0 | 100.0 | 39,200 |
| 145 | 30 | 100 | 5.6 | 93.5 | 42,800 |

TABLE 3B

Comparative Example - The Effect of $CO_2$ Concentration on Reaction Rate, Carbonation Efficiency, and Surface Area in a Non-Pressurized System.

| Batch # | Pressure | % $CO_2$ | Reaction Rate | Carbonation Efficiency (%) | Blaine ($cm^2/g$) |
|---|---|---|---|---|---|
| 149 | 0 | 5 | 2.3 | 60.0 | 23,100 |
| 150 | 0 | 10 | 3.5 | 64.0 | 27,900 |
| 151 | 0 | 15 | 4.2 | 72.0 | 28,100 |
| 152 | 0 | 20 | 4.7 | 77.0 | 27,500 |
| 153 | 0 | 50 | 5.4 | 99.7 | 41,400 |
| 154 | 0 | 100 | 5.8 | 97.0 | 40,500 |

Effect of % $CO_2$ on Key Paper Properties

The PCC produced under pressure carbonation conditions at different carbon dioxide concentrations was used to make paper handsheets. The quality data of key paper properties is set forth in Tables 3C, for handsheets made with PCC manufactured under pressure carbonation conditions, and in Table 3D, for handsheets made with PCC manufactured under atmospheric conditions. The graphical representations of the data are shown in FIGS. 20 through 24. The key characteristics of the paper handsheets as a function of carbon dioxide concentration are given below. In FIG. 20, in paper produced using PCC manufactured under pressure carbonation conditions, the sheet density is shown to increase with increasing carbon dioxide concentration. In FIG. 21, in paper produced using PCC manufactured under pressure carbonation conditions, the Gurley sheet porosity increased over paper produced using PCC manufactured under atmospheric conditions. In other words, the higher Gurley sheet porosity seen in handsheets made from PCC manufactured under pressure carbonation conditions means that tighter sheets were made possible by utilizing PCC manufactured under pressure.

Turning now to FIG. 22, it is important to note that the sheet brightness of handsheets produced from PCC made under pressure was higher than the brightness of handsheets made from PCC produced under atmospheric systems. However, in both cases, an increase in the % $CO_2$ up to about 60% or more resulted in lower sheet brightness.

In FIG. 23, it is also seen that except at low carbon dioxide concentrations, where the sheet opacity was comparable, the sheet opacity of handsheets produced from PCC made under pressure was higher than the opacity of handsheets up through about 60% pressure carbonation.

With respect to scattering coefficient, as seen in FIG. 24, handsheets produced with PCC manufactured under pressure carbonation conditions had higher values for the scattering of light.

TABLE 3C

Effect of % $CO_2$ in a Pressure Carbonation System On Key Paper Properties

| Batch # | % $CO_2$ (%) | Density ($cm^3/g$) | Porosity (sec/100 cc air) | Brightness (ISO) | Opacity (ISO) | Scattering Coefficient ($cm^2/g$) | psig |
|---|---|---|---|---|---|---|---|
| 140 | 5 | 0.592 | 9.04 | 90.13 | 86.74 | 2112.18 | 30 |
| 141 | 10 | 0.581 | 11.55 | 89.49 | 88.52 | 2353.36 | 30 |
| 142 | 15 | 0.585 | 13.80 | 89.41 | 88.27 | 2308.44 | 30 |
| 143 | 20 | 0.595 | 16.95 | 89.40 | 88.53 | 2374.34 | 30 |
| 144 | 50 | 0.613 | 21.74 | 89.63 | 88.68 | 2306.65 | 30 |
| 145 | 100 | 0.613 | 20.66 | 89.33 | 87.96 | 2201.31 | 30 |

TABLE 3D

Comparative Example - Effect of % $CO_2$ in a Non-Pressurized System on Key Paper Properties

| Batch # | % $CO_2$ (%) | Density ($cm^3/g$) | Porosity (sec/100 cc air) | Brightness (ISO) | Opacity (ISO) | Scattering Coefficient ($cm^2/g$) | psig |
|---|---|---|---|---|---|---|---|
| 149 | 5 | 0.592 | 12.11 | 89.40 | 88.08 | 2245.56 | 0 |
| 150 | 10 | 0.581 | 11.44 | 89.19 | 88.49 | 2224.49 | 0 |
| 151 | 15 | 0.588 | 12.17 | 88.97 | 88.13 | 2195.90 | 0 |
| 152 | 20 | 0.592 | 13.40 | 88.95 | 88.36 | 2149.23 | 0 |
| 153 | 50 | 0.613 | 25.04 | 89.05 | 87.60 | 2104.61 | 0 |
| 154 | 100 | 0.595 | 20.09 | 89.13 | 88.66 | 2313.66 | 0 |

EXAMPLE 4
The Effect of Calcium Hydroxide Concentration on Reaction Rate, Carbonation Efficiency, and Surface Area of PCC In this example, the concentration of calcium hydroxide, measured as calcium carbonate, was varied from a low of 35 grams per liter to a high of 308 grams per liter. The constant reaction conditions were as follows:
  $CO_2$ Flow: 1.5 liters per minute
  $CO_2$ Concentration: 20%
  Carbonation Temp.: 100° F.
  Reaction Pressure: 30 psig
The experimental data for variation of calcium hydroxide slurry concentration in a pressure carbonation reactor is shown in Table 4. The reaction rate response, as calcium hydroxide concentration is varied, is given in FIG. 25.

The carbonation efficiency and surface area of the PCC are given in FIGS. 26 and 27, respectively. As shown in FIG. 25, the reaction rate response was curvilinear, an inverse parabola. The carbonation efficiency followed a similar trend. However, as the calcium hydroxide concentration increased, the particle surface area of the PCC manufactured under pressure carbonation conditions decreased steadily from about 55,000 $cm^2/g$ to about 30,000 $cm^2/g$, as the calcium hydroxide concentrations increased from about 25 to about 308 grams per liter of lime slurry. FIGS. 25 and 26 indicate that the initial reaction rates and carbon dioxide efficiency, respectively, were higher at lower calcium hydroxide concentrations. The reaction rate and the carbon dioxide utilization efficiency decreased as the concentration of $Ca(OH)_2$ increased to about 125 grams per liter of calcium hydroxide. However, beyond 150 grams per liter, the reaction rate and the carbon dioxide utilization efficiency increased, reaching a maximum at, or slightly less than, about ~300 grams per liter of $Ca(OH)_2$.

TABLE 4

The Effect of Calcium Hydroxide Concentration on Reaction Rate, Carbonation Efficiency, and Surface Area.

| Batch # | Calcium Hydroxide Concentration (as $CaCO_3$) | Reaction Rate | Carbonation Efficiency (%) | Surface Area ($cm^2/g$) |
|---|---|---|---|---|
| 168 | 25 | 6.3 | 116.64 | 54,800 |
| 162 | 49 | 5.4 | 97.28 | 39,400 |
| 164 | 94 | 4.7 | 80.64 | 47,400 |
| 165 | 151 | 4.7 | 82.20 | 44,400 |
| 163 | 194 | 5.5 | 100.11 | 39,400 |
| 166 | 206 | 5.9 | 100.11 | 27,300 |
| 167 | 266 | 5.9 | 99.73 | 37,300 |
| 161 | 308 | 6.2 | 105.17 | 29,600 |

EXAMPLE 5
Effect of Agitation (RPM of agitator) on Pressure Carbonation

As in example 3, the slaked lime was placed in a pressurized reactor vessel. In this set of experiments, the agitation in the reaction vessel was successively increased from 500 RPM to about 1800 RPM on the agitator. The other reaction conditions were kept constant at the following levels:
  $CO_2$ Flow: 1.5 liters per minute
  $CO_2$ Concentration: 20%
  Carbonation Temperature: 100° F.
  $Ca(OH)_2$ Concentration: ~250 gpl
  Carbonation Pressure: 30 psig
The reaction rate was measured by titration of the lime slurry at regular intervals. The experimental data is given in Table 5. As indicated in FIG. 28, with increased agitation, the reaction rate of carbonation increased three fold from about 2.0 grams per liter per minute of calcium hydroxide consumption to about 6.0 grams per liter per minute of calcium hydroxide consumption. Importantly, under pressure carbonation conditions of 30 psig, with increased agitation, the carbonation efficiency increased from a low of 35.0% to a high of 99.6%, as indicated in FIG. 29. As shown in FIG. 30, the particle surface area of PCC manufactured under pressure carbonation conditions of 30 psig increased from a low of 27,900 $cm^2/g$ as measured by Blaine, to about to 43,400 $cm^2/g$.

TABLE 5

The Effect of Agitation on Reaction Rate, Carbonation Efficiency, and Surface Area.

| Batch # | RPM | Reaction Rate | Carbonation Efficiency (%) | Surface Area (cm$^2$/g) |
|---|---|---|---|---|
| 155 | 400 | 2.0 | 35.619 | 21,900 |
| 156 | 750 | 4.3 | 73.574 | 27,400 |
| 157 | 1100 | 5.2 | 91.592 | 35,100 |
| 158 | 1800 | 5.8 | 102.000 | 43,400 |
| 159 | 1500 | 6.0 | 99.600 | 32,600 |

EXAMPLE 6
Preparation of Sclenohedral PCC

A slaked lime slurry having a concentration of 246 grams per liter of slurry was placed in a pressurized reaction vessel. A gas mixture of 20% carbon dioxide/80% nitrogen was bubbled through the reactor. The initial carbonation reaction temperature was at 100° F. The pressure in the carbonation reaction vessel was maintained at 30 psig. The PCC manufactured under such pressurized carbonation conditions had the following characteristics:

Particle Surface Area=28,200 cm$^2$/gram (Blaine method)

Brightness=96.7 GE

Crystal Habit=Sclenohedral (calcite)

The scanning electron micrograph for this scalenohedral PCC product is shown in FIG. 31. Among other uses, these PCC particles are useful as fillers in paper and paper boards.

EXAMPLE 7
Preparation of Rhombohedral PCC with ~1:1 Aspect Ratio

A slaked lime slurry having a concentration of 87 grams per liter of calcium hydroxide slurry (expressed as calcium carbonate) was placed in a pressurized reaction vessel. A gas mixture of 20% carbon dioxide/80% nitrogen was bubbled through the reactor. The initial carbonation reaction temperature was at 68° F. The increase of reaction temperature was limited to 4.0° F. by circulating cooling water through the reactor. The pressure in the reaction vessel during pressure carbonation was maintained at 20 psig. The PCC manufactured under such pressurized carbonation conditions had the following characteristics:

Particle Surface Area=40,900 cm$^2$/gram (Blaine method)

Brightness=92.1 GE

Aspect Ratio~1:1

The scanning electron micrograph for this rhombohedral PCC product is shown in FIG. 32. Among other uses, these PCC particles can be effectively used for both filler and as coating material for paper.

EXAMPLE 8
Preparation of Rhombohedral PCC with ~1:1.5+Aspect Ratio

By manipulation of process variables, PCC with various aspect ratios can easily and reliably be produced using my pressurized carbonation process. Aspect ratio is the ratio of crystal breadth to crystal length, and is considered a semi-qualitative number. To produce rhombohedral PCC with an aspect ratio of 1:1.5, a slaked lime slurry having a concentration of 116 grams per liter of calcium hydroxide slurry (expressed as calcium carbonate) was placed in a pressurized reaction vessel. A gas mixture of 20% carbon dioxide/80% nitrogen was bubbled through the reactor. The initial carbonation reaction temperature was at 50° F. The reaction was carried out under isothermal conditions, and thus, heat generated by the exothermic nature of the reaction was removed with circulating cooling water to maintain the reactor temperature. The pressure in the reaction vessel during pressure carbonation was maintained at 30 psig. The PCC manufactured under such pressurized carbonation conditions had the following characteristics:

Particle Surface Area=21,500 cm$^2$/gram (Blaine method)

Brightness=98.6 GE

Aspect Ratio~1:1.5+

The scanning electron micrograph for this rhombohedral PCC product is shown in FIG. 33. Among other uses, these rhombohedral PCC particles can be effectively used for both filler and in coating formulations for paper.

EXAMPLE 9
Preparation of "Stacked" Rhombohedral PCC

By manipulation of process variables, a unique "stacked" PCC crystal structure can be reliably produced using my pressurized carbonation process. To produce stacked rhombohedral PCC, a slaked lime slurry having a concentration of 32 grams per liter of calcium hydroxide slurry (expressed as calcium carbonate) was placed in a pressurized reaction vessel. A gas mixture of 25% carbon dioxide/75% nitrogen was bubbled through the reactor. The initial carbonation reaction temperature was at 73° F. The carbonation pressure was maintained at 70 psig. The reaction yielded a PCC with the following characteristics:

Surface Area=16,400 cm$^2$/gram (measured by Blaine)

Brightness=87.3 GE

Crystal Structure=stacked rhombohedral

The scanning electron micrograph for this rhombohedral PCC product is shown in FIG. 34. The pressure carbonation conditions just described provide this unique stacked rhombohedral crystal structure. Among other uses, these stacked rhombohedral PCC particles can be especially useful in coating.

EXAMPLE 10
Preparation of Aragonite PCC

When desired, aragonite crystal habit PCC crystal structure can be reliably produced using my pressurized carbonation process. To produce stacked rhombohedral PCC, a slaked lime slurry having a concentration of 229 grams per liter of calcium hydroxide slurry (expressed as calcium carbonate) was placed in a pressurized reaction vessel. A gas mixture of 25% carbon dioxide/75% nitrogen by volume was bubbled through the reactor. The initial carbonation reaction temperature was at 120° F. The carbonation pressure was maintained at 70 psig. The reaction yielded a PCC with the following characteristics:

Surface Area=23,500 cm$^2$/gram (measured by Blaine)

Brightness=95.0 GE

Crystal Structure=aragonite

The scanning electron micrograph for this aragonite PCC product is shown in FIG. 35. The pressure carbonation conditions just described provide this aragonite crystal structure. Among other uses, these aragonite PCC particles can be useful in filler for paper.

Generally, it should also be noted that the pressure carbonation for production of PCC process as described herein can be used with any convenient source of carbon dioxide, since the pressurization of the reactor advantageously increases the partial pressure of carbon dioxide to an extent that it can be economically exploited. It is to be appreciated that my process for the production of precipitated calcium carbonate is an appreciable improvement in the state of the art for on-site production of calcium carbonate. My novel process treats the manufacture of calcium carbonate in a manufacturing environment from a new perspective, to provide significantly improved production rates.

In my improved manufacturing process, control of the pH, temperature, and time of reaction is determined by the nature of the progress of the reaction in a particular batch. Importantly, the process is readily automated and can be put into an automated process control environment. Although only a few exemplary embodiments of this invention have been described in detail, it will be readily apparent to those skilled in the art that my pressurized production process for manufacture of calcium carbonate, and the apparatus for implementing the process, may be modified from those embodiments provided herein, without materially departing from the novel teachings and advantages provided.

It will thus be seen that the objects set forth above, including those made apparent from the preceding description, are efficiently attained. Since certain changes may be made in carrying out the method for production of precipitated calcium carbonate according to the teachings herein, it is to be understood that my invention may be embodied in other specific forms without departing from the spirit or essential characteristics thereof. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

The intention is to cover all modifications, equivalents, and alternatives falling within the scope and spirit of the invention, as expressed herein above and in the appended claims. As such, the claims are intended to cover the methods, apparatus, structures (including crystal structures), and products described herein, and not only the equivalent methods or structural equivalents thereof, but also equivalent methods or structures. The scope of the invention, as described herein and as indicated by the appended claims, is thus intended to include variations from the embodiments provided which are nevertheless described by the broad meaning and range properly afforded to the language of the claims, as explained by and in light of the terms included herein, or the equivalents thereof.

What is claimed is:

1. A method for the production of precipitated calcium carbonate, said method comprising:
    (a) providing a source of calcium ions;
    (b) mixing said source of calcium ions with a solvent to create a slurry, said slurry comprising (i) an undissolved portion of said source of calcium ions, and (ii) a solution comprising calcium ions;
    (c) feeding said slurry to a reactor;
    (d) bubbling a gas stream comprising carbon dioxide through said slurry while maintaining said reactor at a pressure above atmospheric pressure, to produce carbonate ions from said carbon dioxide, and then reacting said carbonate ions with said calcium ions to form a calcium carbonate precipitate;
    (e) agitating the contents of said reactor,
    (f) wherein the acts of creation of said slurry and reaction of said slurry are performed sequentially, and
    (g) wherein the time required for the act of reacting said slurry is approximately the same as the time required for act of creating said slurry.

2. The process as set forth in claim 1, wherein said solvent comprises water.

3. The process as set forth in claim 2, wherein said reactor is provided with an instrument to measure pH of said slurry during said step (d), and wherein the step of bubbling a gas comprising carbon dioxide through said reactor is continued until the pH of said slurry ranges from about 6.5 to about 7.5.

4. The process as set forth in claim 3, wherein during operation of said process, one or more process or product variables is selected for control of said process, and wherein each of said one or more said variable is selected from the group consisting of (a) calcium carbonate product surface area, as measured by the Blaine method, (b) carbon dioxide utilization efficiency, (c) production rate of calcium carbonate as measured by the conversion rate of calcium hydroxide slurry, in grams of calcium hydroxide consumed per liter per minute, and (d) crystal habit.

5. The process as set forth in claim 2, wherein said slurry comprises calcium oxide.

6. The process as set forth in claim 2, wherein said slurry comprises calcium hydroxide.

7. The process as set forth in claim 6, wherein said slurry comprises from about 32 grams per liter of calcium hydroxide to about 308 grams per liter of calcium hydroxide, expressed as calcium carbonate.

8. The process as set forth in claim 6, wherein said slurry comprises from about 200 grams per liter of calcium hydroxide to about 250 grams per liter of calcium hydroxide, expressed as calcium carbonate.

9. The process as set forth in claim 2, wherein said reaction step (d) is carried out isothermally at about 50 degrees F., and wherein said precipitated calcium carbonate comprises a rhombohedral PCC crystal habit having an aspect ratio of about 1:1.5.

10. The process as set forth in claim 9, wherein at the start of said reaction step (d), said slurry comprises about 116 grams per liter of calcium hydroxide.

11. The process as set forth in claim 9, wherein during said reaction step (d), said reactor pressure is maintained at about 70 psig.

12. The process as set forth in claim 2, wherein said reaction step (d) is carried out at about 68 degrees F., and wherein said precipitated calcium carbonate comprises a rhombohedral PCC crystal habit having an aspect ratio of about 1:1.

13. The process as set forth in claim 12, wherein at the start of said reaction step (d), said slurry comprises about 87 grams per liter of calcium hydroxide.

14. The process as set forth in claim 12, wherein during said reaction step (d), said reactor pressure is maintained at about 20 psig.

15. The process as set forth in claim 2, wherein said reaction step (d) is carried out with a starting slurry temperature of about 73 degrees F., and wherein said precipitated calcium carbonate comprises a stacked rhombohedral PCC crystal habit.

16. The process as set forth in claim 15, wherein at the start of said reaction step (d), said slurry comprises about 32 grams per liter of calcium hydroxide.

17. The process as set forth in claim 15, wherein during said reaction step (d), said reactor pressure is maintained at about 70 psig.

18. The process as set forth in claim 2, wherein said reaction step (d) is carried out with a starting slurry temperature of about 100° F., and wherein said precipitated calcium carbonate comprises a scalenohedral PCC crystal habit.

19. The process as set forth in claim 18, wherein at the start of said reaction step (d), said slurry comprises about 246 grams per liter of calcium hydroxide.

20. The process as set forth in claim 18, wherein during said reaction step (d), said reactor pressure is maintained at about 30 psig.

21. The process as set forth in claim 2, wherein said reaction step (d) is carried out with a starting slurry temperature of about 120° F., and wherein said precipitated calcium carbonate comprises an aragonite crystal habit.

22. The process as set forth in claim 21, wherein at the start of said reaction step (d), said slurry comprises about 229 grams per liter of calcium hydroxide.

23. The process as set forth in claim 21, wherein during said reaction step (d), said reactor pressure is maintained at about 70 psig.

24. The process as set forth in claim 2, wherein said step (b), comprises slaking of lime and is carried out in a slaker, and wherein said step (d), comprises carbonation and is carried out in a pressurized reactor, and wherein said slaker and said pressurized reactor are matched, capacity throughput wise, so that said reactor and said slaker are each sequentially utilized for efficient optimization of equipment.

25. The process as set forth in claim 24, wherein said slaker and said pressurized reactor are matched, capacity wise, so that said slaker and said pressurized reactor are engaged in substantially continuous operations.

26. The process as set forth in claim 2, wherein said slurry, at time of feed to said reactor, has a pH in excess of 12.

27. The process as set forth in claim 2, wherein said reactor is provided with an instrument to measure pH of said slurry during said step (d), and wherein the step of bubbling a gas comprising carbon dioxide through said reactor is continued until said slurry pH reaches about 7.0.

28. The process as set forth in claim 1, wherein said source of calcium ion is selected from the group consisting of calcium oxide and calcium hydroxide.

29. The process as set forth in claim 3, wherein said solution comprising calcium ions comprises partially solubilized calcium hydroxide.

30. The process as set forth in claim 1, wherein the step of creating said slurry comprises slaking lime.

31. The process as set forth in claim 1, wherein the step of reacting said slurry comprises carbonation of said soluble calcium ions.

32. The process as set forth in claim 1, wherein during said step (d), solute from said slurry is dissolved to maintain the concentration of calcium ions at or near the solubility limit of said solute in said solvent, until the supply of calcium ions is substantially converted to calcium carbonate.

33. The process as set forth in claim 1, wherein said process further comprises thoroughly mixing said slurry by mechanically agitating said slurry.

34. The process as set forth in claim 1, wherein the pressure in said reactor maintained at a pre-selected level, based on a process or product variable selected for optimization.

35. The process as set forth in claim 1, wherein the partial pressure of carbon dioxide during said step (d) is maintained in excess of 0.2 atmospheres.

36. The process as set forth in claim 1, wherein the partial pressure of carbon dioxide during said step (d) is maintained between 0.2 atmospheres and 1.0 atmospheres.

37. The process as set forth in claim 1, wherein the partial pressure of carbon dioxide during said step (d) is maintained at approximately 0.4 atmospheres.

38. The process as set forth in claim 1, wherein the pressure in said reactor during reaction of said slurry is maintained at least above 5 psig.

39. The process as set forth in claim 1, wherein the pressure in said reactor during reaction of said slurry is maintained between about 5 psig and about 70 psig.

40. The process as set forth in claim 1, wherein the pressure in said reactor during reaction of said slurry is maintained at above atmospheric pressure but not more than about 30 psig.

41. The process as set forth in claim 1, wherein the pressure in said reactor during reaction of said slurry is maintained at about 30 psig.

42. The process as set forth in claim 1, wherein said gas stream comprises from about 5 percent carbon dioxide by volume to about 100 percent carbon dioxide by volume.

43. The process as set forth in claim 1, wherein said gas stream comprises from about 10 percent to about 25 percent carbon dioxide by volume.

44. The process as set forth in claim 1, wherein said gas stream comprises about 20 percent carbon dioxide by volume.

45. The process as set forth in claim 1, wherein said gas stream comprises 10 percent or less carbon dioxide by volume.

46. The process as set forth in claim 1, wherein said gas stream comprises between 5 percent and 10 percent carbon dioxide by volume.

47. The process as set forth in claim 1, wherein said reactor further comprises an agitator, and wherein said process further comprises the step of thoroughly mixing said slurry and said gas stream during said reaction step (d).

48. The process as set forth in claim 47, wherein the step of thoroughly mixing said slurry and said gas stream is performed with a mechanical agitator.

49. The process as set forth in claim 47, wherein the step of thoroughly mixing said slurry and said gas stream is performed with a mechanical agitator operating at a rotational speed between 500 revolutions per minute and 1500 revolutions per minute.

50. The process as set forth in claim 47, wherein the step of thoroughly mixing said slurry and said gas stream is performed with a mechanical agitator having a tip speed of between 260 feet per minute and 764 feet per minute.

51. The process as set forth in claim 1, wherein reaction of said slurry is carried out at the rate of formation of calcium carbonate in excess of 0.50 grams per liter per minute.

52. The process as set forth in claim 1, wherein said reaction of said slurry is carried out at the rate of formation of calcium carbonate of from about 0.5 to about 10 grams per liter per minute.

53. The process as set forth in claim 1, wherein said reaction of said slurry is carried out at the rate of formation of calcium carbonate of from about 5 to about 6 grams per liter per minute.

54. The process as set forth in claim 1, wherein said reaction of said slurry is carried out at the rate of formation of calcium carbonate in excess of about 10 grams per liter per minute.

55. The process as set forth in claim 1, wherein said gas stream containing carbon dioxide is provided to said reactor at the rate of from about 0.4 to about 4.0 liters per minute, based on said gas stream at atmospheric pressure, based on a 20% by volume carbon dioxide concentration in said gas stream.

56. The process as set forth in claim 1, wherein said gas stream containing carbon dioxide is provided to said reactor at the rate of about 2 liters per minute, based on said gas stream at atmospheric pressure, based on a 20% by volume carbon dioxide concentration in said gas stream.

57. The process as set forth in claim 1, wherein the step (d) is carried out at a temperature of from about 50° F. to about 120° F.

58. The process as set forth in claim 1, wherein the step (d) is carried out at a temperature of from about 75° F. to about 105° F.

59. The process as set forth in claim 1, wherein the step (d) is carried out at a temperature of about 100° F.

60. The process as set forth in claim 1, wherein said precipitated calcium carbonate has an average specific surface area, as measured by the Blaine method, from between about 15,000 $cm^2$/gram, to about 60,000 cm 2/gram.

61. The process as set forth in claim 1, wherein said precipitated calcium carbonate has an average specific surface area, as measured by the Blaine method, less than about 15,000 $cm^2$/gram.

62. The process as set forth in claim 1, wherein said precipitated calcium carbonate has an average specific surface area, as measured by the Blaine method, more than about 60,000 $cm^2$/gram.

63. The process as set forth in claim 1, wherein said gas stream comprises carbon dioxide in a flue gas from combustion of a hydrocarbon fuel.

64. The process as set forth in claim 1, wherein said gas stream comprises carbon dioxide in a gas from the thermal decomposition of lime mud.

65. The process as set forth in claim 1, wherein said carbon dioxide in said gas stream is utilized at an efficiency of at least 90 percent.

66. The process as set forth in claim 65, wherein said carbon dioxide in said gas stream is utilized at an efficiency of at least 95 percent.

67. The process as set forth in claim 1, wherein said carbon dioxide in said gas stream is utilized at an efficiency of at least 99 percent.

68. The process as set forth in claim 1, further comprising between said step of creating said slurry and said step of charging said reactor with said slurry, the step of cooling said slurry.

69. The process as set forth in claim 1, further comprising the step of providing a PCC storage tank, and wherein a carbon dioxide gas stream is bubbled through said PCC storage tank.

70. The process as set forth in claim 1, further characterized in that said reactor is sized less than 200 gallons capacity per ton per day of PCC output.

71. The process as set forth in claim 70, further characterized in that said reactor is sized less than 100 gallons capacity per ton per day of PCC output.

72. The process as set forth in claim 70, further characterized in that said reactor is sized less than 50 gallons capacity per ton per day of PCC output.

* * * * *